(12) United States Patent
Ando

(10) Patent No.: US 11,475,294 B2
(45) Date of Patent: Oct. 18, 2022

(54) CLASSIFICATION APPARATUS FOR DETECTING A STATE OF A SPACE WITH AN INTEGRATED NEURAL NETWORK, CLASSIFICATION METHOD, AND COMPUTER READABLE MEDIUM STORING A CLASSIFICATION PROGRAM FOR SAME

(71) Applicant: OMRON Corporation, Kyoto (JP)

(72) Inventor: Tanichi Ando, Komaki (JP)

(73) Assignee: OMRON Corporation, Kyoto (JP)

( * ) Notice: Subject to any disclaimer, the term of this patent is extended or adjusted under 35 U.S.C. 154(b) by 843 days.

(21) Appl. No.: 16/386,431

(22) Filed: Apr. 17, 2019

(65) Prior Publication Data
US 2019/0244101 A1  Aug. 8, 2019

Related U.S. Application Data

(63) Continuation of application No. PCT/JP2017/010016, filed on Mar. 13, 2017.

(30) Foreign Application Priority Data

Dec. 6, 2016  (JP) .............................. JP2016-237056

(51) Int. Cl.
*G06N 3/08* (2006.01)
*G06N 3/067* (2006.01)
(Continued)

(52) U.S. Cl.
CPC .............. *G06N 3/08* (2013.01); *G01B 11/00* (2013.01); *G06N 3/067* (2013.01); *G06T 7/00* (2013.01)

(58) Field of Classification Search
CPC .......... G06N 3/08; G06N 3/088; G06N 3/067; G06N 3/0445; G06N 3/04; G06N 20/10;
(Continued)

(56) References Cited

U.S. PATENT DOCUMENTS 5,845,000 A   12/1998  Breed et al.
2009/0092284 A1*  4/2009  Breed .................. G01S 7/4802
                                                                382/103
(Continued)

FOREIGN PATENT DOCUMENTS

AU   2006239171 B2    7/2012
CA      2816978 C  *  7/2020  .......... F21V 23/0471
(Continued)

OTHER PUBLICATIONS

Extended European search report dated Jan. 2, 2020 in a counterpart European patent application.
(Continued)

*Primary Examiner* — Li Wu Chang
(74) *Attorney, Agent, or Firm* — Metrolex IP Law Group, PLLC

(57) ABSTRACT

A classification apparatus includes: a specifying unit integrated with a neural network that has been trained to classify a state of a space using information indicating a light projection pattern and information indicating a light reception pattern; a light projection information acquisition unit configured to acquire information indicating a light projection pattern of light projected into a predetermined space, and output the acquired information to the specifying unit; and a light receiving unit configured to acquire information indicating a light reception pattern of light received from the predetermined space, and output the acquired information to the specifying unit, wherein the specifying unit outputs a classification result of classifying a state of the predetermined space, based on the information indicating the light projection pattern acquired by the light projection information acquisition unit and on the information indicating the light reception pattern of the light received by the light receiving unit.

18 Claims, 11 Drawing Sheets

(51) Int. Cl.
  *G01B 11/00* (2006.01)
  *G06T 7/00* (2017.01)
(58) Field of Classification Search
  CPC ........ G01B 11/00; G06T 7/00; G06V 10/141; G06K 9/6267; G06K 9/62
  See application file for complete search history.

(56) References Cited

U.S. PATENT DOCUMENTS

| | | |
|---|---|---|
| 2010/0060884 A1 | 3/2010 | Tohyama et al. |
| 2011/0285982 A1 | 11/2011 | Breed |
| 2012/0076361 A1 | 3/2012 | Fujiyoshi |
| 2013/0003069 A1 | 1/2013 | Umeda et al. |
| 2015/0010228 A1 | 1/2015 | Rogers et al. |

FOREIGN PATENT DOCUMENTS

| | | |
|---|---|---|
| CN | 101600936 A | 12/2009 |
| CN | 101600936 B | 2/2011 |
| CN | 102589419 A | 7/2012 |
| CN | 102803991 A | 11/2012 |
| CN | 105358934 A | 2/2016 |
| CN | 105651776 A | 6/2016 |
| CN | 105872757 A | 8/2016 |
| JP | H05-272925 A | 10/1993 |
| JP | H06-288913 A | 10/1994 |
| JP | H08-5348 A | 1/1996 |
| JP | 2010-190865 A | 9/2010 |
| JP | 2011-191221 A | 9/2011 |
| JP | 2014-059654 A | 4/2014 |

OTHER PUBLICATIONS

Office Action dated Sep. 2, 2020 in a counterpart Japanese patent application.
English translation of the International Search Report("ISR") of PCT/JP2017/010016 dated May 23, 2017.
Written Opinion("WO") of PCT/JP2017/010016 dated May 23, 2017.
Office Action dated May 14, 2020 in a counterpart Chinese patent application.
Office Action (CNOA) dated Mar. 1, 2021 in a counterpart Chinese patent application.

* cited by examiner (a)

(b)

(c)

(d)

(a)

(b)

(c)

(d)

CLASSIFICATION APPARATUS FOR DETECTING A STATE OF A SPACE WITH AN INTEGRATED NEURAL NETWORK, CLASSIFICATION METHOD, AND COMPUTER READABLE MEDIUM STORING A CLASSIFICATION PROGRAM FOR SAME

CROSS-REFERENCES TO RELATED APPLICATION

This application is a continuation application of International Application No. PCT/JP2017/010016, filed on Mar. 13, 2017, which claims priority based on the Article 8 of Patent Cooperation Treaty from prior Japanese Patent Application No. 2016-237056, filed on Dec. 6, 2016, the entire contents of which are incorporated herein by reference.

TECHNICAL FIELD

The disclosure relates to a classification apparatus, a classification method, and a program that use a classifier that has been trained using a neural network.

RELATED ART

A technique of detecting the presence and/or the state of an object using light, such infrared light, has been developed. Patent Document 1 discloses a moving-body three-dimensional movement detection method, i.e. a method for detecting three-dimensional motion of a trunk or torso using an infrared depth sensor. In the moving-body three-dimensional movement detection method described in Patent Document 1, points on the surface of a moving subject that is moving on the side opposing the infrared depth sensor across a shielding plate, which cuts off visible light and allows infrared light to pass therethrough, are detected in time series by the infrared depth sensor, adjacent ones of the detected points are connected with connecting lines, and the surface of the moving object 12 is thus expressed with mesh formed by these connection lines. A feature point of the moving body 12 at each point in time is extracted using this mesh, and three-dimensional motion of the moving body is detected based on a change over time in the feature point.

RELATED ART DOCUMENTS

Patent Documents

Patent Document 1: JP 2014-59654A

SUMMARY OF THE INVENTION

To detect the state of a predetermined space using light such as infrared light, as with the moving-body three-dimensional movement detection method described in Patent Document 1, a relationship between information that indicates the state of the predetermined space and a light pattern needs to be analyzed. However, there are a large number of light patterns and these light patterns are complicated since there are a path of direct incident light and a path of reflected light. For this reason, it takes more time and cost to create, by means of ordinary programming, a determination program that enables the state of a predetermined space to be determined using the light pattern. In view of the foregoing problem, one or more aspects aim to provide a classification apparatus, a classification method, and a program that can classify the state of a predetermined space using light, such as infrared light, while reducing the time and cost required to create a determination program.

A classification apparatus according to one or more aspects includes: a specifying unit into which a neural network is integrated that has been trained to classify a state of a space using information indicating a light projection pattern and information indicating a light reception pattern; a light projection information acquisition unit configured to acquire information indicating a light projection pattern of light projected into a predetermined space, and output the acquired information to the specifying unit; and a light receiving unit configured to acquire information indicating a light reception pattern of light received from the predetermined space, and output the acquired information to the specifying unit, wherein the specifying unit is configured to output a classification result of classifying a state of the predetermined space, based on the information indicating the light projection pattern acquired by the light projection information acquisition unit and on the information indicating the light reception pattern of the light received by the light receiving unit.

The classification apparatus with the above configuration can classify the state of a predetermined space using light, such as infrared light, while reducing the time and cost required to create a determination program.

In the classification apparatus according to one or more aspects, the light projection information acquisition unit may be configured to acquire information indicating a light projection pattern of light projected onto a target within the predetermined space, and to output the acquired information to the specifying unit, the light receiving unit may be configured to acquire a light reception pattern of the light projected onto the target within the predetermined space, and to output the acquired light reception pattern to the specifying unit, and the specifying unit may be configured to output a classification result of classifying a presence or a state of the target within the predetermined space.

The classification apparatus with the above configuration can classify the presence or the state of a target within a predetermined space by performing classification using the light projection pattern of light projected onto the target within the predetermined space and the light reception pattern of this light.

In the classification apparatus according to one or more aspects, the neural network integrated into the specifying unit may have been trained to classify the state of the space using information indicating a light projection pattern of light that is projected into a space that is given in advance, and information indicating a light reception pattern of light received from the space that is given in advance.

The classification apparatus with the above configuration can cause the neural network to perform supervised learning by causing the neural network to learn the state of a space that is given in advance.

In the classification apparatus according to one or more aspects, the neural network integrated into the specifying unit may have been trained to classify the state of the space using information indicating a plurality of light projection patterns, and information indicating light reception patterns of light that is received when projecting the plurality of light projection patterns.

The classification apparatus with the above configuration can create learning data using different light projection patterns, even if the number of light projection units to project light is a predetermined number, by performing learning with the neural network using the information indicating a plurality of light projection patterns, and thus can increase the learning data.

In the classification apparatus according to one or more aspects, the neural network integrated into the specifying unit may have been trained to classify the state of the space using learning data in which the information indicating the light projection pattern, the information indicating the light reception pattern, and information indicating the state of the space are associated with each other.

The classification apparatus with the above configuration can cause the neural network to perform supervised learning using learning data in which the information indicating the light projection pattern, the information indicating the light reception pattern, and the information indicating the state of a space are associated with each other, and thus can classify the state of a predetermined space using light, such as infrared light.

In the classification apparatus according to one or more aspects, the neural network integrated into the specifying unit may have been trained to classify the state of the space using auxiliary information from an auxiliary sensor, in addition to the information indicating the light projection pattern and the information indicating the light reception pattern.

The classification apparatus with the above configuration can further enhance the ability to detect the state of a predetermined space by using various auxiliary sensors in addition to the sensor for projecting and receiving light, such as infrared light.

A classification method according to one or more aspects includes: a specifying step of integrating a neural network that has been trained to classify a state of a space using information indicating a light projection pattern and information indicating a light reception pattern; a light projection information acquisition step of acquiring information indicating a light projection pattern of light projected into a predetermined space, and outputting the acquired information to a specifying unit; and a light receiving step of acquiring information indicating a light reception pattern of light received from the predetermined space, and outputting the acquired information to the specifying unit, wherein, in the specifying step, a classification result of classifying a state of the predetermined space is output based on the acquired information indicating the light projection pattern and the information indicating the light reception pattern of the received light.

The classification method with the above configuration can classify the state of a predetermined space using light, such as infrared, while reducing the time and cost required to create a determination program.

A program according to one or more aspects causes a computer to execute: a specifying function of integrating a neural network that has been trained to classify a state of a space using information indicating a light projection pattern and information indicating a light reception pattern; a light projection information acquisition function of acquiring information indicating a light projection pattern of light projected into a predetermined space, and outputting the acquired information to a specifying unit; and a light receiving function of acquiring information indicating a light reception pattern of light received from the predetermined space, and outputting the acquired information to the specifying unit, wherein the specifying function outputs a classification result of classifying a state of the predetermined space based on the acquired information indicating the light projection pattern and the information indicating the light reception pattern of the received light.

The program with the above configuration can classify the state of a predetermined space using light, such as infrared light, while reducing the time and cost required to create a determination program.

Effects of the Invention

According to the classification apparatus, the classification method, and the program according to one or more aspects, the state of a predetermined space can be detected using light, such as infrared light, while reducing the time and cost required to create a determination program.

EMBODIMENTS OF THE INVENTION

First Embodiment

A first embodiment will be described with reference to the drawings.

Overview

In a first embodiment, machine learning is performed based on measurement information obtained by a sensor, and the state of a predetermined space is detected using a detection function that has learned through the machine learning.

Figure 1:
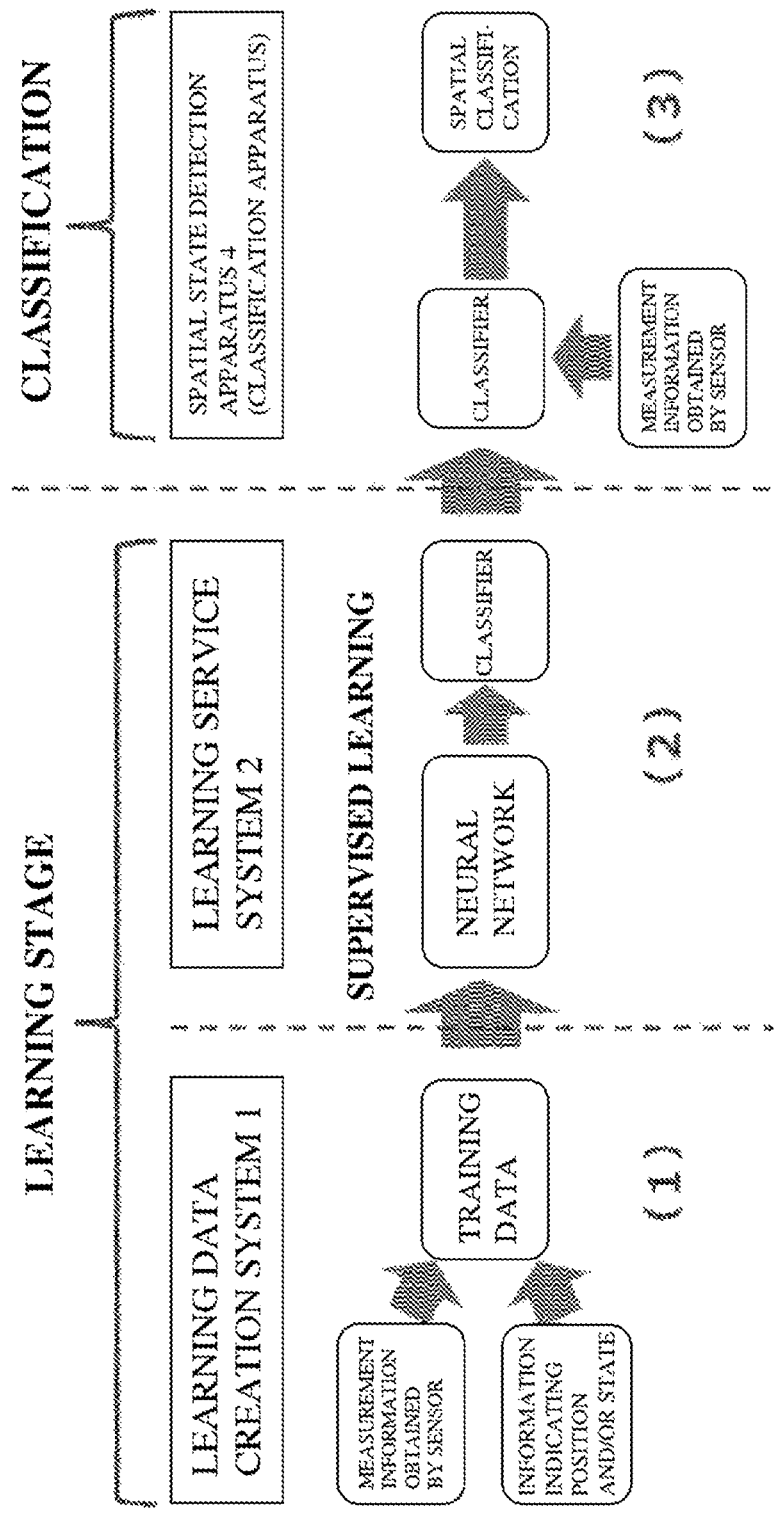
FIG. 1 is a diagram illustrating an overview of a classification system according to a first embodiment.

FIG. 1 is a diagram illustrating an overview of a classification system according to a first embodiment. As shown in FIG. 1, the classification system according to a first embodiment first creates learning data using a learning data creation system 1 (1). The learning data creation system 1 creates training data (learning data) based on measurement information indicating a detection target obtained by the sensor, and information indicating the state of a predetermined space.

Next, a learning service system 2 performs supervised learning with a neural network, based on the learning data created by the learning data creation system 1 (2). The learning service system 2 sequentially inputs the training data (learning data) to the neural network, thereby adjusting parameters (weights) for respective layers in the neural network and creating a classifier capable of ideal output (classification).

Then, a spatial state detection apparatus (classification apparatus) 4 classifies the spatial state (the state of an object) when predetermined input (measurement information obtained by the sensor) is given thereto, using the created classifier (3).

System Configuration

Figure 2:
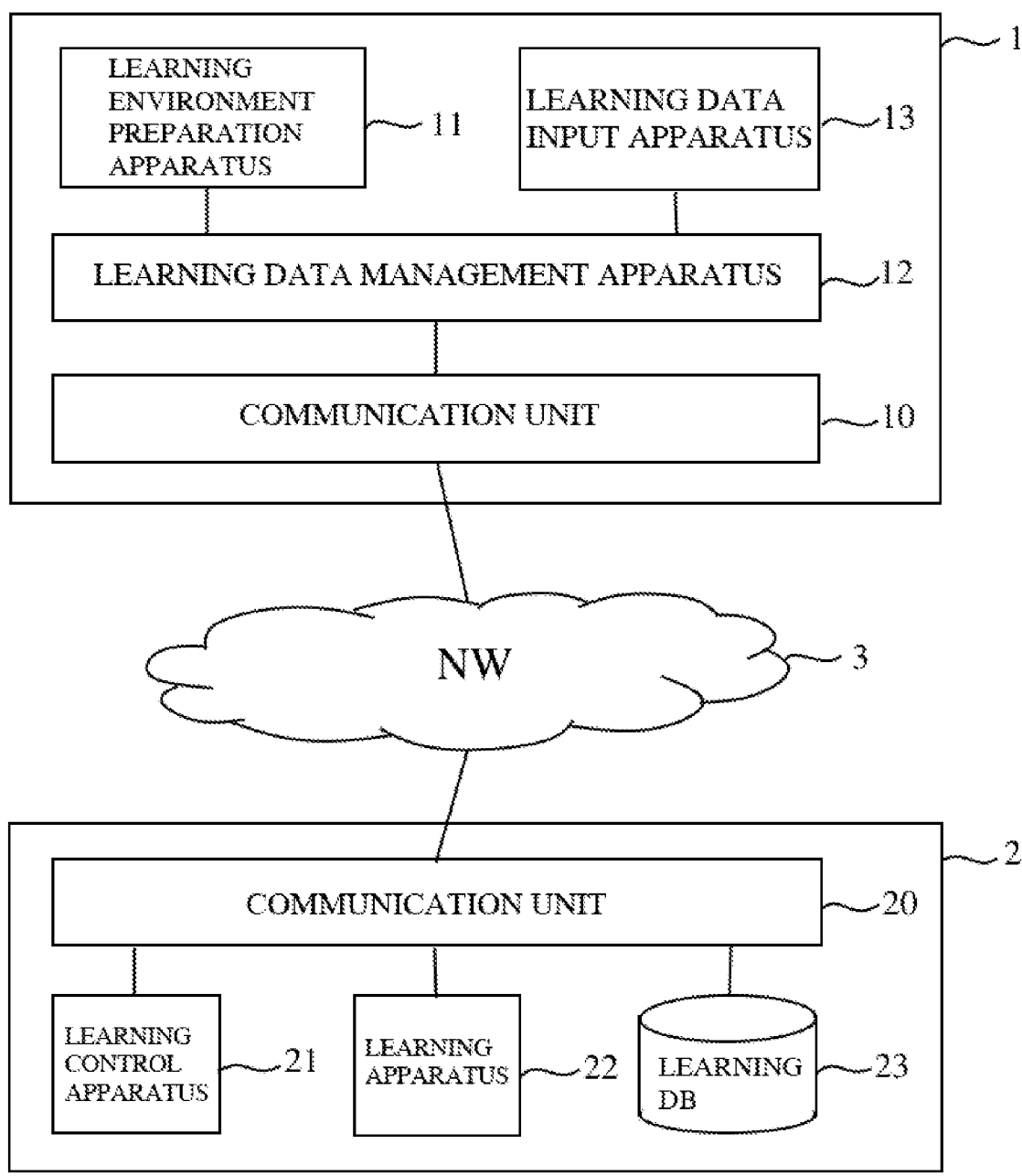
FIG. 2 is a diagram illustrating a configuration example of a learning system according to a first embodiment.

FIG. 2 is a diagram illustrating a configuration example of a learning system according to a first embodiment. As shown in FIG. 2, the learning system includes the learning data creation system 1, the learning service system 2, and a network 3.

The network (NW) 3 is a communication network for connecting the learning data creation system 1 and the learning service system 2 to each other. The NW 3 may be a wired network or a wireless network, for example. Specifically, the NW 3 may be a wireless LAN (WLAN), a wide area network (WAN), ISDN (integrated service digital network), a wireless LAN, an LTE (long term evolution) network, a CDMA (code division multiple access) network, or the like. Note that the NW 3 is not limited to these examples, and may also be, for example, a public switched telephone network (PSTN), a Bluetooth (registered trademark) network, a satellite link, or the like, and may be any kind of network.

Configuration Example of Learning Data Creation System 1

The learning data creation system 1 is a system for creating learning data. As shown in FIG. 2, the learning data creation system 1 includes a communication unit 10, a learning environment preparation apparatus 11, a learning data management apparatus 12, and a learning data input apparatus 13.

The communication unit 10 is a communication interface for the learning data creation system 1 to perform communication. The learning data management apparatus 12 transmits and receives data via the communication unit 10.

The learning data management apparatus 12 is an apparatus for managing learning data, which is training data, generated by the learning environment preparation apparatus 11. The learning data management apparatus 12 reads out learning data, which is training data, from the learning environment preparation apparatus 11 and notifies the learning service system 2 of the read learning data, in accordance with a request from the learning service system 2.

The learning data input apparatus 13 is an apparatus for collecting measurement information indicating the state of a predetermined space, or receiving input of measurement information, and providing the measurement information to the learning environment preparation apparatus 11. The state of a predetermined space is information indicating the position and/or the state of a person, an object, a robot or the like, which is a detection target. For example, the learning data input apparatus 13 collects measurement information, such as a light projection pattern of a light projection unit and an arrangement pattern of a light receiving unit, or receives input of measurement information, and provides the measurement information to the learning environment preparation apparatus 11.

The learning environment preparation apparatus 11 is an apparatus for creating learning data, which is training data. Learning data generated by the learning environment preparation apparatus 11 is supervised training data, for example. The learning environment preparation apparatus 11 creates learning data and provides the created learning data to the learning service system 2.

Configuration Example of Learning Environment Preparation Apparatus 11

Figure 3:
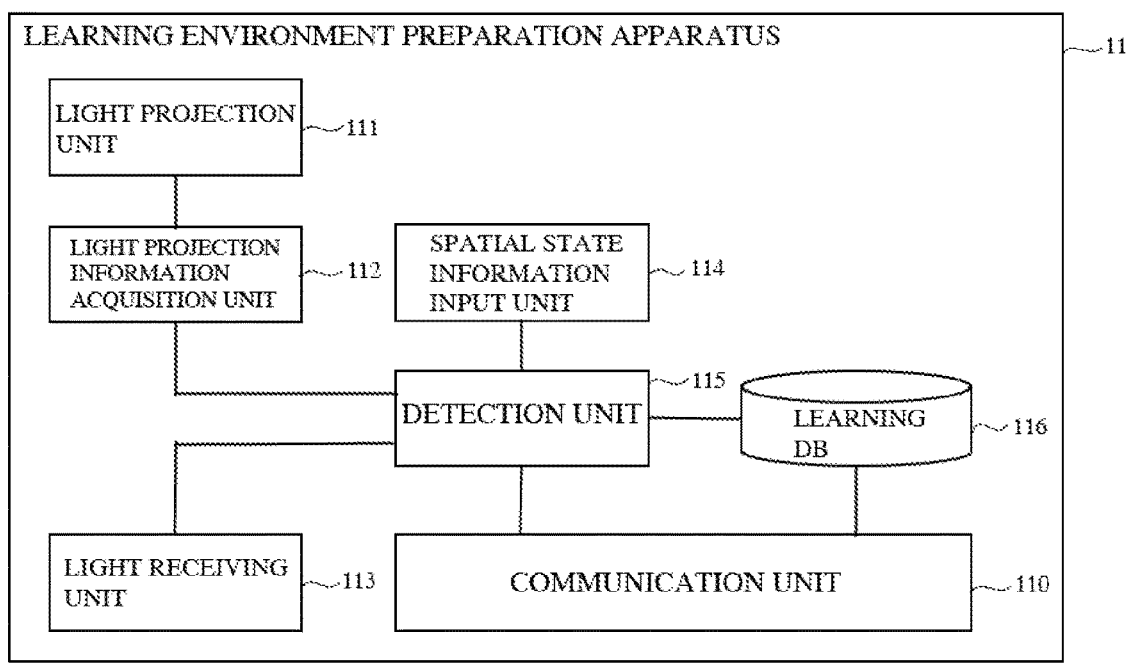
FIG. 3 is a diagram illustrating a configuration example of a learning environment preparation apparatus according to a first embodiment.

FIG. 3 is a diagram illustrating a configuration example of the learning environment preparation apparatus 11 according to a first embodiment.

As shown in FIG. 3, the learning environment preparation apparatus 11 includes a communication unit 110, a light projection unit 111, a light projection information acquisition unit 112, a light receiving unit 113, a spatial state information input unit 114, a detection unit 115, and a learning database (DB) 116.

The communication unit 110 is a communication interface for the learning environment preparation apparatus 11 to perform communication. The detection unit 115 and the learning DB 116 transmit and receive data via the communication unit 110.

The light projection unit 111 has a function of projecting light, such as infrared light. The light projection unit 111 is a portion of the sensor. The light projection unit 111 can project light, such as infrared light, in a predetermined pattern.

The light projection information acquisition unit 112 has a function of detecting a light projection pattern of light, such as infrared light, projected by the light projection unit 111. Note that the light projection pattern of the light projection unit 111 may be predetermined, or may be random. The light projection information acquisition unit 112 may acquire a predetermined light projection pattern, or may detect light projected by the light projection unit 111 and detect the light projection pattern thereof.

The light projection information acquisition unit 112 also has a function of acquiring light projection information, namely information indicating light projected by the light projection unit 111. The light projection information is information indicating what kind of light a target is irradiated with. The light projection information acquisition unit 112 acquires information indicating what kind of light the light projection unit irradiates the target with. For example, the light projection information acquisition unit 112 outputs information indicating which light projection device is outputting light. The light projection information may also include information indicating the brightness and color. The light projection information may also be light projection pattern identification information obtained by combining the aforementioned pieces of information.

The light receiving unit 113 has a function of receiving light from the light projection unit 111. A plurality of light receiving units 113 may be provided. The light receiving unit 113 outputs the received light to the detection unit 115. If a plurality of light receiving units 113 are provided, the arrangement of the light receiving units 113 can be changed in a predetermined cycle or at random.

The spatial state information input unit 114 receives input of information indicating the state of a predetermined space. For example, the spatial state information input unit 114 receives input of information indicating the position and/or the state of a person, an object, a robot, or the like, which is a detection target. The spatial state information input unit 114 notifies the detection unit 115 of the received information indicating the position and/or the state of the detection target.

The detection unit 115 detects the light reception pattern that is input from the light receiving unit 113.

Also, the detection unit 115 associates (1) information indicating the state of the predetermined space of which the detection unit 115 has been notified by the spatial state information input unit 114, (2) the light projection pattern of which the detection unit 115 has been notified by the light projection information acquisition unit 112, and (3) the light reception pattern of which the detection unit 115 has been notified by the light receiving unit 113, with each other. The detection unit 115 notifies the learning DB 116 of the associated information.

Every time the learning DB 116 receives a notification from the detection unit 115, the learning DB 116 stores (1) the information indicating the state of the predetermined space, (2) the light projection pattern of which the detection unit 115 has been notified by the light projection information acquisition unit 112, and (3) the light reception pattern of which the detection unit 115 has been notified by the light receiving unit 113, in association with each other. In the information stored in the learning DB 116, (1) the information indicating the state of the detection target has been identified, and the information stored in the learning DB 116 is used as learning data, which is training data.

The learning environment preparation apparatus 11 creates learning data, which is training data, as follows, for example.

Movement learning data is, for example, learning data regarding a movement (gesture) of a person. Note that the movement learning data is not limited to learning data regarding a movement of a person, and may be any kind of data. The following description will take, as an example, the case where the movement learning data is learning data regarding a movement of a person.

The learning environment preparation apparatus 11 initially acquires an action pattern for each of a plurality of movements (gestures) of a person. Thereafter, the learning environment preparation apparatus 11 notifies a humanoid robot of the acquired movement patterns as action instruction information, and causes the humanoid robot to perform a gesture movement. Although the learning environment preparation apparatus 11 may cause a person, in place of a humanoid robot, to perform a movement, a humanoid robot can be repeatedly caused to perform gesture movements, and enables more learning data to be acquired.

The learning environment preparation apparatus 11 creates learning data, which is training data, by associating each one of a plurality of movements (gestures) of the humanoid robot (or the person) with the light projection pattern of the light projection unit 111 and the light reception pattern of the light receiving unit 113.

The learning environment preparation apparatus 11 changes the light projection pattern of the light projection unit 111 and the arrangement of the light receiving unit 113, the light projection unit 111 and the light receiving unit 113 constituting the sensor, for one movement (gesture) to create a large number of pieces of learning data, which is training data. For example, the learning environment preparation apparatus 11 creates learning data for one movement (gesture) based on a light projection pattern and a light reception pattern in the case where the light projection unit 111 and the light receiving unit 113 are arranged to form a lattice shape within a rectangular region near a console of an automobile.

Note that the following description will take, as an example, the case where a person or a humanoid robot performs a movement (gesture).

Then, the learning environment preparation apparatus 11 also changes the light projection pattern of the light projection unit 111 and the arrangement of the light receiving unit 113, the light projection unit 111 and the light receiving unit 113 constituting the sensor, for other movements (gestures) to create a large number of pieces of learning data, which is training data.

In the case where, for example, learning data is created for a spatial state where a person steps on an accelerator, the learning environment preparation apparatus 11 first creates a plurality of pieces of learning data by changing the light projection pattern of the light projection unit 111 and the light reception pattern of the light receiving unit 113 for a predetermined manner of stepping on the accelerator.

Subsequently, the learning environment preparation apparatus 11 also similarly creates a plurality of pieces of learning data by changing the light projection pattern of the light projection unit 111 and the light reception pattern of the light receiving unit 113 for other manners of stepping on the accelerator that differ from the predetermined manner.

The learning environment preparation apparatus 11 repeatedly performs this operation, and creates a plurality of pieces of learning data by changing the light projection pattern of the light projection unit 111 and the light reception pattern of the light receiving unit 113 for different manners of stepping on the accelerator. As a result, the learning environment preparation apparatus 11 creates a large number of training data (learning data) for the spatial state where a person steps on the accelerator.

As described above, the learning environment preparation apparatus 11 can create a large number of pieces of learning data for a movement (gesture) of a person.

Configuration Example of Learning Service System 2

As shown in FIG. 2, the learning service system 2 includes a communication unit 20, a learning control apparatus 21, a learning apparatus 22, and a learning DB 23.

The communication unit 20 is a communication interface for the learning service system 2 to perform communication. The learning control apparatus 21, the learning apparatus 22, and the learning DB 23 transmit and receive data via the communication unit 20.

The learning control apparatus 21 is an apparatus that makes a request to start learning and a request for a learning result to the learning apparatus 22. The learning control apparatus 21 also has a function of storing the learning result acquired from the learning apparatus 22 in the learning DB 23.

The learning DB 23 has a function of storing the learning result obtained by the learning apparatus 22. The learning DB 23 is realized by any of various storage media such as an HDD (Hard Disk Drive), an SSD (Solid State Drive), and a flash drive, for example. However, in a first embodiment, the learning DB 23 is not limited thereto.

The learning apparatus 22 trains a neural network using the learning data generated by the learning environment preparation apparatus 11. The learning apparatus 22 performs supervised learning with the neural network. But in a first embodiment, the learning apparatus 22 may also perform unsupervised learning.

Configuration Example of Learning Apparatus 22

Figure 4:
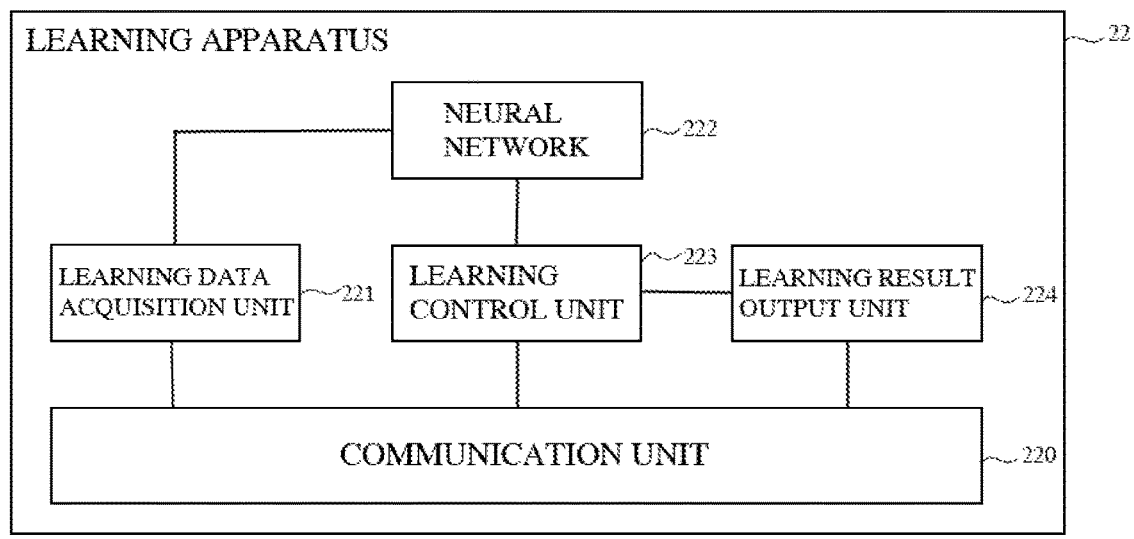
FIG. 4 is a diagram illustrating a configuration example of a learning apparatus according to a first embodiment.

FIG. 4 is a diagram illustrating a configuration example of the learning apparatus 22 according to a first embodiment. The learning apparatus 22 includes a communication unit 220, a learning data acquisition unit 221, a neural network 222, a learning control unit 223, and a learning result output unit 224.

The communication unit 220 is a communication interface for the learning apparatus 22 to perform communication. The learning data acquisition unit 221, the learning control unit 223, and the learning result output unit 224 transmit and receive data via the communication unit 220.

The learning data acquisition unit 221 acquires learning data generated by the learning environment preparation apparatus 11 in the learning data creation system 1, via the communication unit 220.

The neural network 222 receives input of learning data from the learning data acquisition unit 221 and supervised learning is performed therewith. Note that the neural network 222 may be a hierarchical neural network or a deep neural network, for example.

The neural network 222 is a network that has a hierarchical structure, for example. The neural network 222 is constituted by, for example, an input layer, an intermediate layer, and an output layer, and each of the layers has a plurality of nodes. In the neural network 222, selected weights are set between the nodes in the input layer and the intermediate layer and between the nodes in the intermediate layer and the output layer, and a classification problem can be solved by adjusting the connection state between the nodes. Note that a neural network 222 that has an intermediate layer is a hierarchical neural network. The learning apparatus 22 adjusts the weight for the nodes in the respective layers by inputting training data to the neural network 222, and creates a classifier capable of making appropriate output.

The neural network 222 may also be a deep neural network that has a plurality of intermediate layers. The deep neural network is constituted by an input layer, a plurality of intermediate layers, and an output layer, and each of the layers has a plurality of nodes. In the deep neural network, selected weights are set between the nodes in the input layer and the intermediate layers and between the nodes in the intermediate layers and the output later to adjust the connection state between the nodes, and thus a classifier capable of solving a classification problem can be created.

Note that, in a first embodiment, the neural network 222 is not limited to a hierarchical neural network or a deep neural network, and may also be an interconnected neural network in which the nodes are connected to each other.

The model of the neural network 222 according to a first embodiment may be, for example, simple perceptron, back propagation, a support vector machine, the Hopfield model, a self-organizing map, or the like, but is not limited to these examples and may be any kind of model.

The learning control apparatus 223 has a function of managing learning with the neural network 222, and instructs the learning data acquisition unit 221 to input learning data. The learning control apparatus 223 also outputs learning results obtained by the neural network 222 via the learning result output unit 224 and the communication unit 220.

The learning result output unit 224 has a function of temporarily storing the learning results obtained by the neural network 222 and collectively outputting the stored learning results. The learning results obtained by the neural network 222 serve as a classifier capable of receives predetermined input and appropriately outputting the state of a predetermined space, for example.

Configuration Example of Spatial State Detection Apparatus 4

Figure 5:
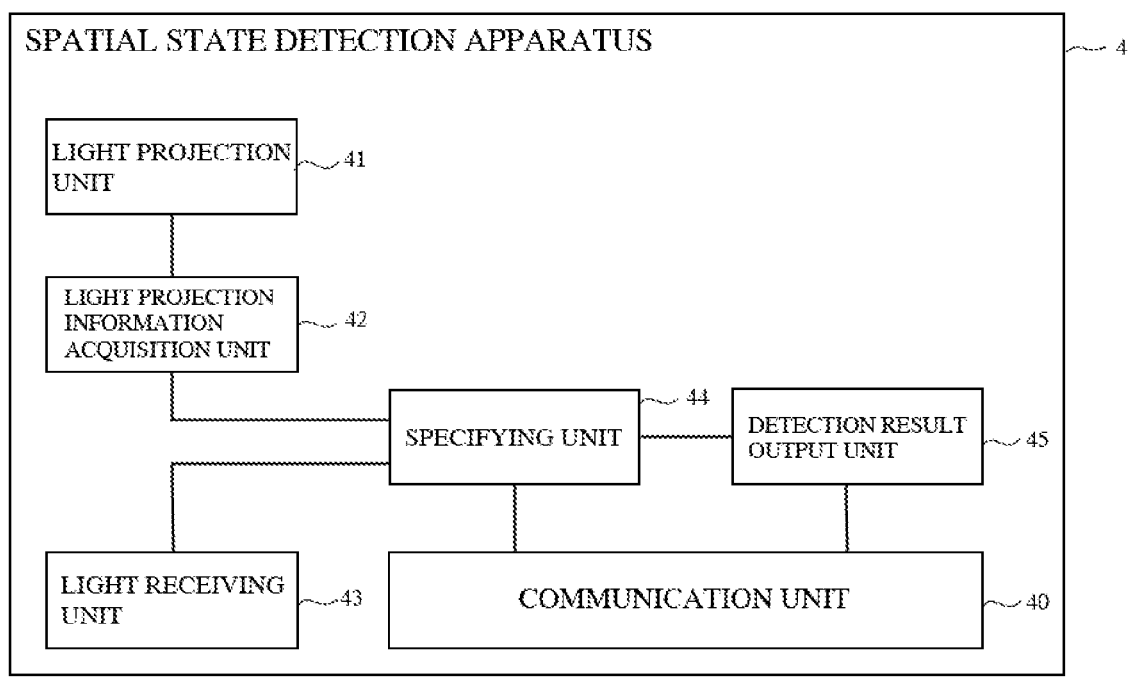
FIG. 5 is a diagram illustrating a configuration example of a spatial state detection apparatus according to a first embodiment.

FIG. 5 is a diagram illustrating a configuration example of the spatial state detection apparatus 4 according to a first embodiment. As shown in FIG. 5, the spatial state detection apparatus 4 includes a communication unit 40, a light projection unit 41, a light projection information acquisition unit 42, a light receiving unit 43, a specifying unit 44, and a detection result output unit 45.

The communication unit 40 is a communication interface for the spatial state detection apparatus 4 to perform communication. The specifying unit 44 and the detection result output unit 45 transmit and receive data via the communication unit 110.

The light projection unit 41 projects light, such as infrared light, in a predetermined light projection pattern. The light projection unit 41 can project light, such as infrared light, in a predetermined pattern.

The light projection information acquisition unit 42 has a function of collecting the light projection pattern of the light, such as infrared light, projected by the light projection unit 41. Note that the light projection pattern of the light projection unit 41 may be predetermined, or may be random. The light projection information acquisition unit 42 may also acquire a predetermined light projection pattern by referencing a storage unit (not shown) that stores this light projection pattern, or may also acquire the predetermined light projection pattern from the learning data creation system 1 or the learning service system 2 via the communication unit 40. The light projection information acquisition unit 42 may also detect light projected by the light projection unit 41 and detect a light projection pattern thereof.

The light receiving unit 43 has a function of receiving light from the light projection unit 41. A plurality of light receiving units 113 may be provided. The light receiving unit 43 outputs the received light to the specifying unit 44. If a plurality of light receiving units 43 are provided, the arrangement of the light receiving units 43 can be changed in a predetermined cycle or at random.

The specifying unit 44 can detect (classify) the state where a target is present, based on the light projection pattern of the light projection unit 41 and the light reception pattern of the light receiving unit 43, using the classifier created through the learning with the neural network 222. The specifying unit 44 can also detect (classify) specific states. For example, the specifying unit 44 can detect specific states such as a state where a hand is present in a gesture area and a state where a tip portion of a foot is present on an acceleration pedal or a brake pedal, and can also detect a state where the acceleration pedal is about to be stepped on, and a state where the brake pedal is about to be stepped on.

The specifying unit 44 may also detect (classify), for example, a state where a hand is present near a handle, a state where a hand is present near a selector level, a state where a hand is present near a steering wheel, and a state where a hand is approaching a car navigation device or an audio device. The specifying unit 44 may also detect (classify) a state where an object other than a hand is present. The specifying unit 44 may also detect (classify) a state where an occupant is leaning on his back side.

The specifying unit 44 may also detect (classify) whether or not the selector level is likely to be operated, and whether or not the current state is a state where a steering operation can be performed, or may determine whether or not reception of voice commands needs to be started by detecting (classifying) a predetermined movement.

The detection result output unit 45 has a function of giving a notification of the detection results obtained by the specifying unit 44, via the communication unit 40.

Note that the spatial state detection apparatus 4 and the learning data creation system 1 may share a configuration that has the same functions.

Operation Example

Figure 6:
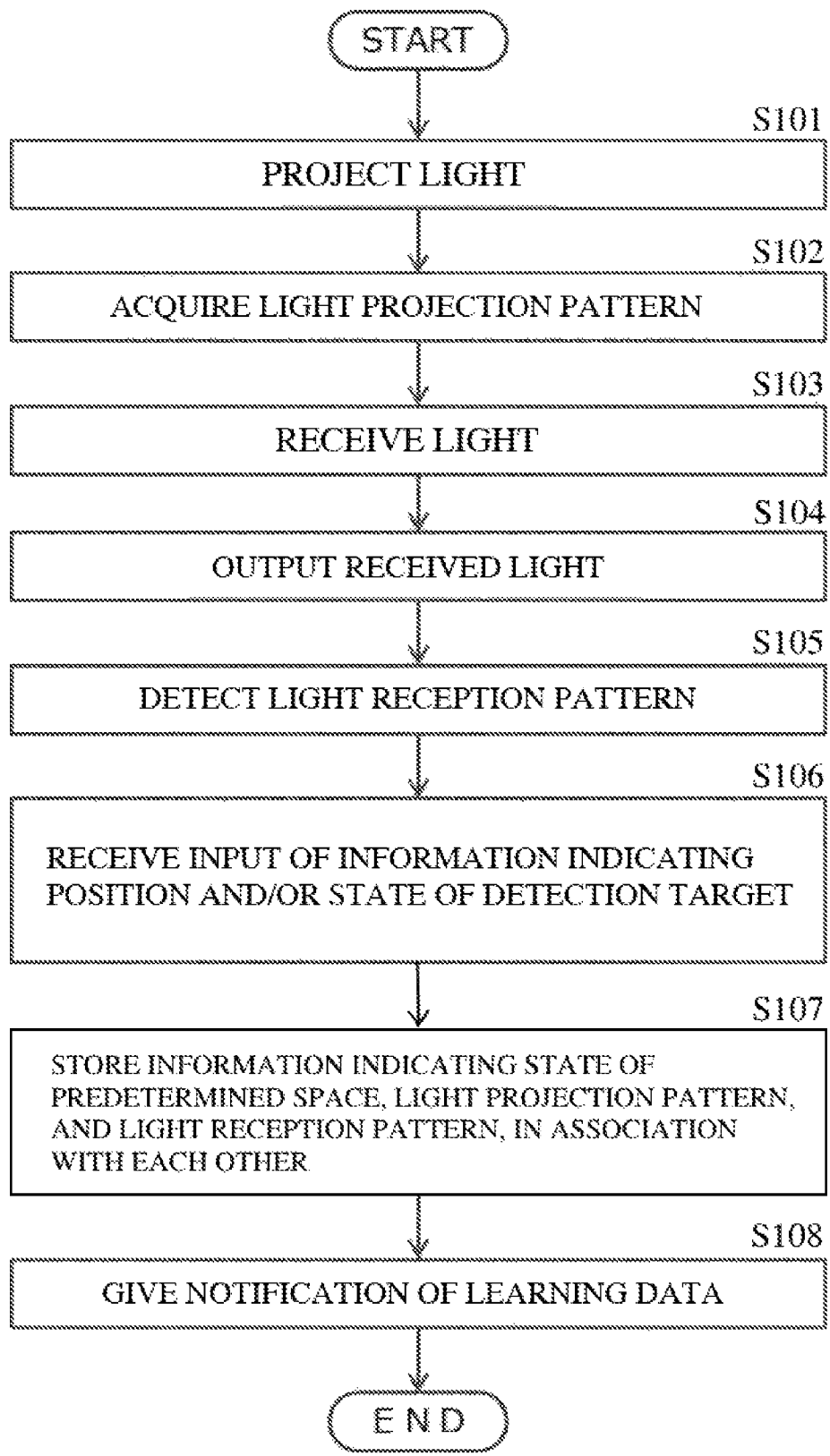
FIG. 6 is a diagram illustrating an operation example of a learning environment preparation apparatus according to a first embodiment.

FIG. 6 illustrates an operation example of the learning environment preparation apparatus 11 according to a first embodiment. The learning environment preparation apparatus 11 is an apparatus for creating learning data, which is training data, as mentioned above.

The light projection unit 111 projects light, such as infrared light (S101). The light projection information acquisition unit 112 then collects the light projection pattern of the light, such as infrared light, projected by the light projection unit 111 (S102).

The light receiving unit 113 receives the light from the light projection unit (S103), and outputs the received light to the detection unit 115 (S104).

The detection unit 115 detects the light reception pattern of the light input from the light receiving unit 113 (S105).

The spatial state information input unit 114 receives input of information indicating the position and/or the state of a person, an object, a robot, or the like, which is a detection target (S106). The spatial state information input unit 114 receives input of information indicating the position and/or the state of the person, the object, the robot, or the like, which is a detection target, when the light, such as infrared light, was projected.

The detection unit 115 then associates (1) information indicating the state of a predetermined space of which the detection unit 115 has been notified by the spatial state information input unit 114, (2) the light projection pattern of which the detection unit 115 has been notified by the light projection information acquisition unit 112, and (3) the light reception pattern of which the detection unit 115 has been notified by the light receiving unit 113, with each other (S107). Thereafter, the detection unit 115 notifies the learning DB 116 of this association (learning data) S108.

Note that, every time the learning DB 116 receives a notification from the detection unit 115, the learning DB 116 stores (1) information indicating the state of the detection target, (2) the light projection pattern of which the detection unit 115 has been notified by the light projection information acquisition unit 112, and (3) the light reception pattern of which the detection unit 115 has been notified by the light receiving unit 113, in association with each other.

Thus, the learning environment preparation apparatus 11 can create learning data, which is training data. Note that the learning environment preparation apparatus 11 creates learning data for each piece of information indicating the position and/or the state of a plurality of detection targets.

Figure 7:
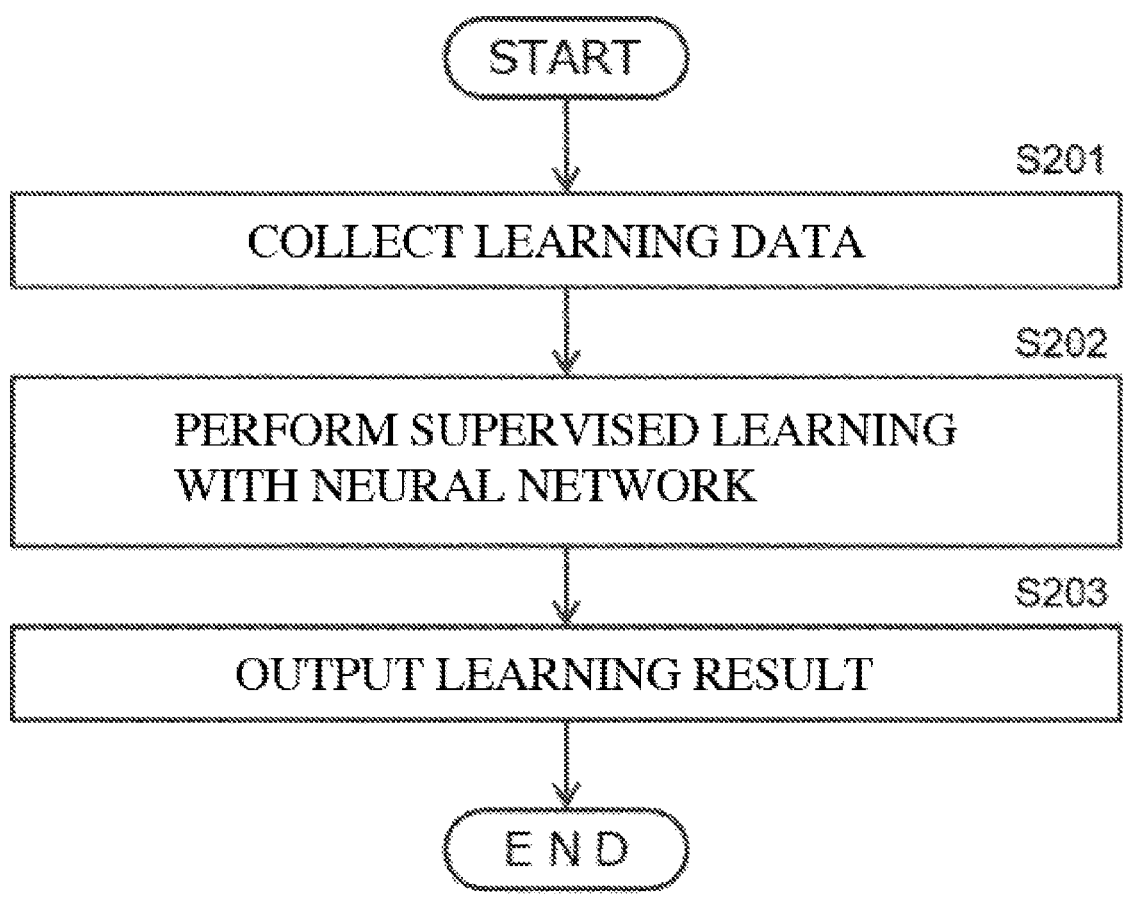
FIG. 7 is a diagram illustrating an operation example of a learning apparatus according to a first embodiment.

FIG. 7 illustrates an operation example of the learning apparatus 22 according to a first embodiment. Note that the learning apparatus 22 can perform each operation under the control of the learning control unit 223 of the learning apparatus 22.

The learning data acquisition unit 221 acquires, via the communication unit 110, learning data generated by the learning environment preparation apparatus 11 in the learning data creation system 1 (S201).

The neural network 222 receives the input of the learning data from the learning data acquisition unit 221, and supervised learning is performed (S202). The learning apparatus 22 adjusts the weights for the nodes in the respective layers by inputting training data to the neural network 222, and creates a classifier capable of making appropriate output.

The learning control apparatus 223 outputs the learning results obtained by the neural network 222 via the learning result output unit 224 and the communication unit 220 (S203). The learning results obtained by the neural network 222 serve as a classifier capable of receiving predetermined input and making appropriately output, for example.

As a result of the above processes, the learning apparatus 22 can perform supervised learning with the neural network 222, and a classifier can be created that is capable of outputting an appropriate spatial state if predetermined input is received.

Figure 8:
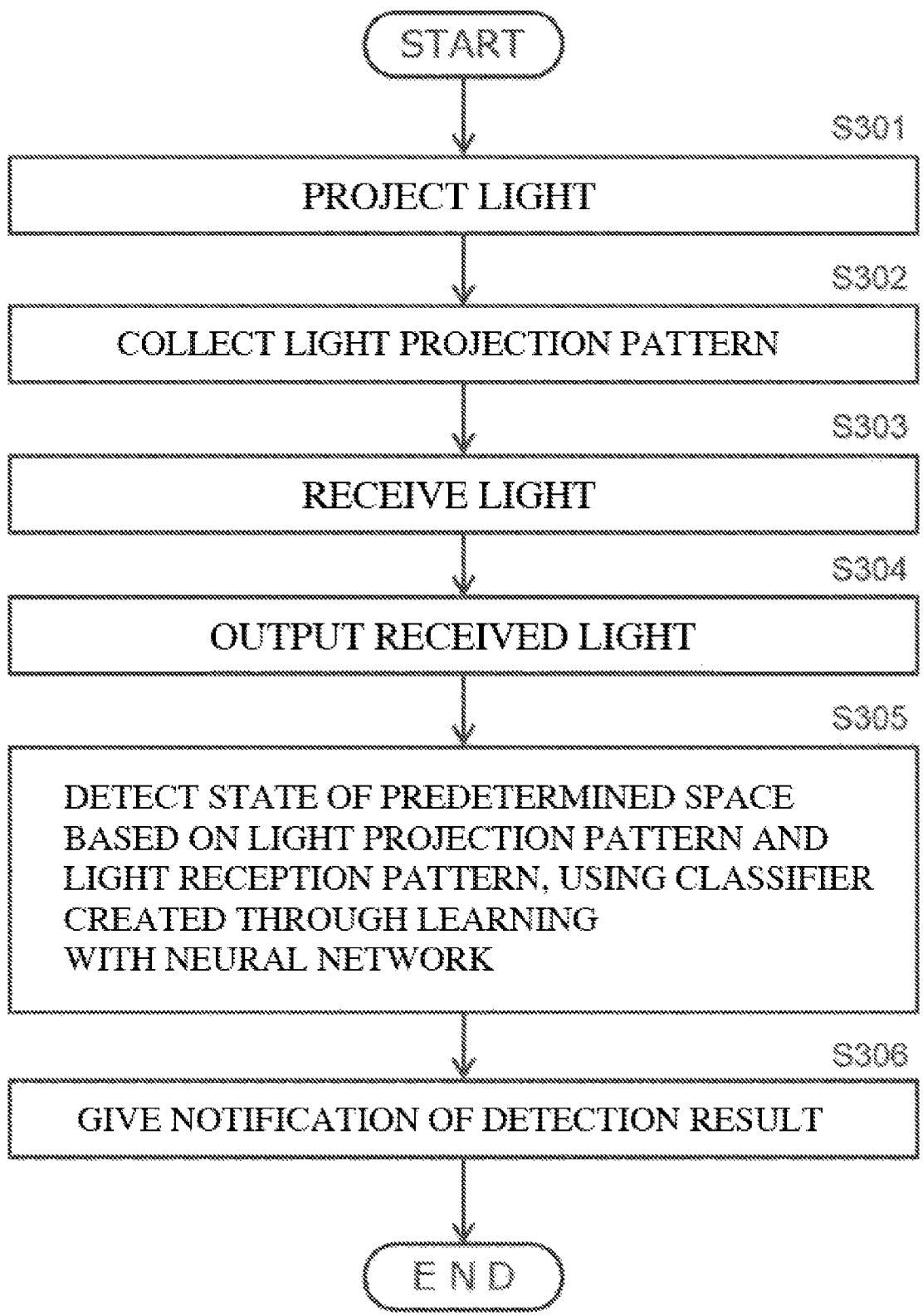
FIG. 8 is a diagram illustrating an operation example of a spatial state detection apparatus according to a first embodiment.

FIG. 8 is an operation example of the spatial state detection apparatus 4 according to a first embodiment.

The light projection unit 41 projects light, such as infrared light, in a predetermined light projection pattern (S301). The light projection information acquisition unit 42 collects the light projection pattern of light, such as infrared light, projected by the light projection unit 41 (S302).

The light receiving unit 43 receives the light from the light projection unit 41 (S303), and outputs the received light to the specifying unit 44 (S304).

The specifying unit 44 detects the state of a predetermined space based on the light projection pattern of the light projection unit 41 and the light reception pattern of the light receiving unit 41, using the classifier created through the learning with the neural network 222 (S305).

The detection result output unit 45 has a function of giving a notification of the detection results obtained by the specifying unit 44, via the communication unit 40 (S306).

As described above, according to a first embodiment, training data (learning data) is created based on measurement information indicating a detection target of the sensor, and information indicating the state of a predetermined space, learning is performed with the neural network 222 using the created training data, and the state of the space is detected based on a classifier, which is constituted by the learning results. Thus, the state of the predetermined space can be detected using light, such as infrared light, while reducing the time and cost required to create a determination program.

Sensor

The details of a sensor according to a first embodiment will be described below with reference to the drawings.

Basic Configuration

The sensor is a device for detecting a physical quantity that is affected by the presence of an object in a predetermined space whose state is to be detected. For example, the sensor may be a photosensor, such as an infrared light sensor. The light projection unit (which is the light projection unit 41 or the light projection unit 111, which will not be mentioned hereinafter) radiates light, such as infrared light, toward the light receiving unit (which is the light receiving unit 43 or the light receiving unit 113, which will not be mentioned hereinafter) and the light having been interrupted by an object or the like is detected. The sensor may be any kind of device as long as it can detect the state of a predetermined space. For example, the sensor may use not only infrared light but also light with any wavelength, electromagnetic waves, radio waves, capacitance, or the like, to detect the state. Also, the sensor may perform detection using any kind of method as long as the sensor can detect a physical quantity that is affected by the presence of an object in a predetermined space whose state is to be detected.

The sensor may also be one that projects light, such as infrared light, and detects reflected light of the projected light, for example. Furthermore, the sensor may also be one that measures a temporal change in received light. Measurement information indicating the state where an object with a complicated shape is present in a complicated space can also be detected by increasing the number of light projection units and light receiving units.

Light Used in Detection by Sensor

Infrared light can be used as the light that is to be used in detection. Infrared light, which is invisible to human eyes, has the characteristic that a person does not notice the light if infrared light is used. To identify a feature that is visible to human eyes, visible light needs to be used.

A light-emitting diode that projects infrared light can be used as the light projection unit. Any light-emitting device that outputs light with a wavelength or electromagnetic waves that is to be used in detection can be used as the light projection unit.

Note that the light that is to be used in detection is not limited to infrared light, and light with any wavelength or electromagnetic waves can be used. Any wavelength can be selected for the light that is to be used in detection, in accordance with the size of an object to be detected. For example, light with a shorter wavelength enables a more detailed feature to be detected. Specifically, in the case of arranging minute light projection units and light receiving units using an LSI (Large-Scale Integration) technique, a shorter wavelength enables a more detailed feature to be identified. Such a device (sensor) can detect a feature of the target without using an optical system for forming an image, such as a lens. For example, such a device can detect a difference due to minute projections and recesses on the surface of the target.

Ambient light or reflected light or ambient light can be detected by operating the light receiving unit at a timing at which the light projection unit is not emitting light. Reflected light, direct light, and transmitted light of the light radiated from the light projection unit can be detected by operating the light receiving unit at a timing at which the light projection unit that uses infrared light or the like is emitting light. Detection of a target is facilitated by combining these methods.

Note that, even if the above-described detection is attempted using a camera, the camera is larger than a light-emitting diode or a photodiode, resulting in a smaller degree of freedom in installation, and it is therefore difficult to perform such detection.

Detection Method Used by Sensor

The sensor is arranged within a detection target space, which is a predetermined space whose state is to be detected, and detects measurement information indicating the state of this detection target space. The following description will take, as an example, a sensor that is arranged inside or outside an automobile.

For example, a plurality of light projection units and light receiving units of the sensor that project and receive light, such as infrared light, are arranged inside or outside the automobile, and the sensor detects light having been interrupted by an object or the like. The sensor may be arranged to form a lattice or array shape on a rectangular panel or the like, for example. This sensor detects the amount of infrared light that is detected by each of the plurality of light receiving units when the light projection units emit light, for example. The sensor does not necessarily need to include the light projection units, and ambient light, such as sunlight, may be detected by the light receiving units.

The light projection units in the sensor can change the lighting pattern thereof. The light from the light projection units in the sensor changes its radiation pattern according to the lighting pattern, and measurement information can be detected with various patterns.

For example, in the case of flashing the light projection units, the light from the light projection units can be received by the light receiving units by operating the light receiving units at timings at which the light projection units emit light. By flashing the light projection units, the energy required to emit light can be reduced, and the lifetime of light-emitting devices, such as light-emitting diodes, can be prolonged. Also, direct light or reflected light when light is being radiated can be detected by the light receiving units receiving light while the light projection units emit light. In contrast, if the light receiving units are operated at timings at which the light projection units are not lit up, the influence of ambient light can be detected. As a result, the influence of ambient light can be canceled out by subtracting the amount of light detected by the light receiving units when the light projection units are not lit up from the amount of light detected by the light receiving units when the light projection units emit light, and a detection result in the case of only receiving light projected by the light projection units can be obtained.

The detection area of the sensor changes depending on the positions at which the light projection units and the light receiving units are attached. For this reason, variation of the detection area can be changed by the combination of the positions at which the light projection units and the light receiving units.

The detection area of the sensor also changes depending on the mode of the light projected by the light projection units. The modes of the light include, for example, a straight beam, a conic/quadrangular pyramid beam, a parallel beam, radial beams, and so on. Note that the mode of the projected light is not limited to these examples, and may be any mode.

Figure 9:
FIG. 9 is a diagram illustrating examples of light projection patterns according to a first embodiment.
Figure 9:
Figure 9:
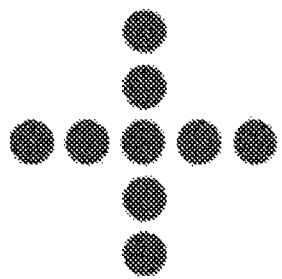
Figure 9:
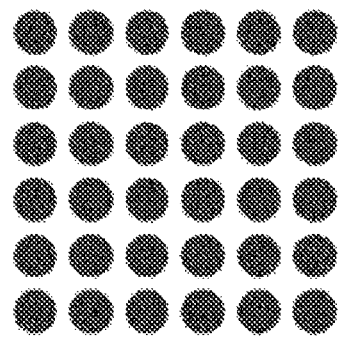

FIG. 9 is a diagram illustrating arrangement patterns of the light projection units in the sensor. As shown in FIGS. 9(*a*) and 9(*b*), the plurality of light projection units may be arranged in a vertical line or a horizontal line. The plurality of light projection units may alternatively be arranged to form a cross shape, as shown in FIG. 9(*c*), or may be arranged to form a square shape, as shown in FIG. 9(*d*). Note that the arrangement pattern of the light projection units is not limited to these examples, and the light projection units may be arranged in any manner.

Figure 10:
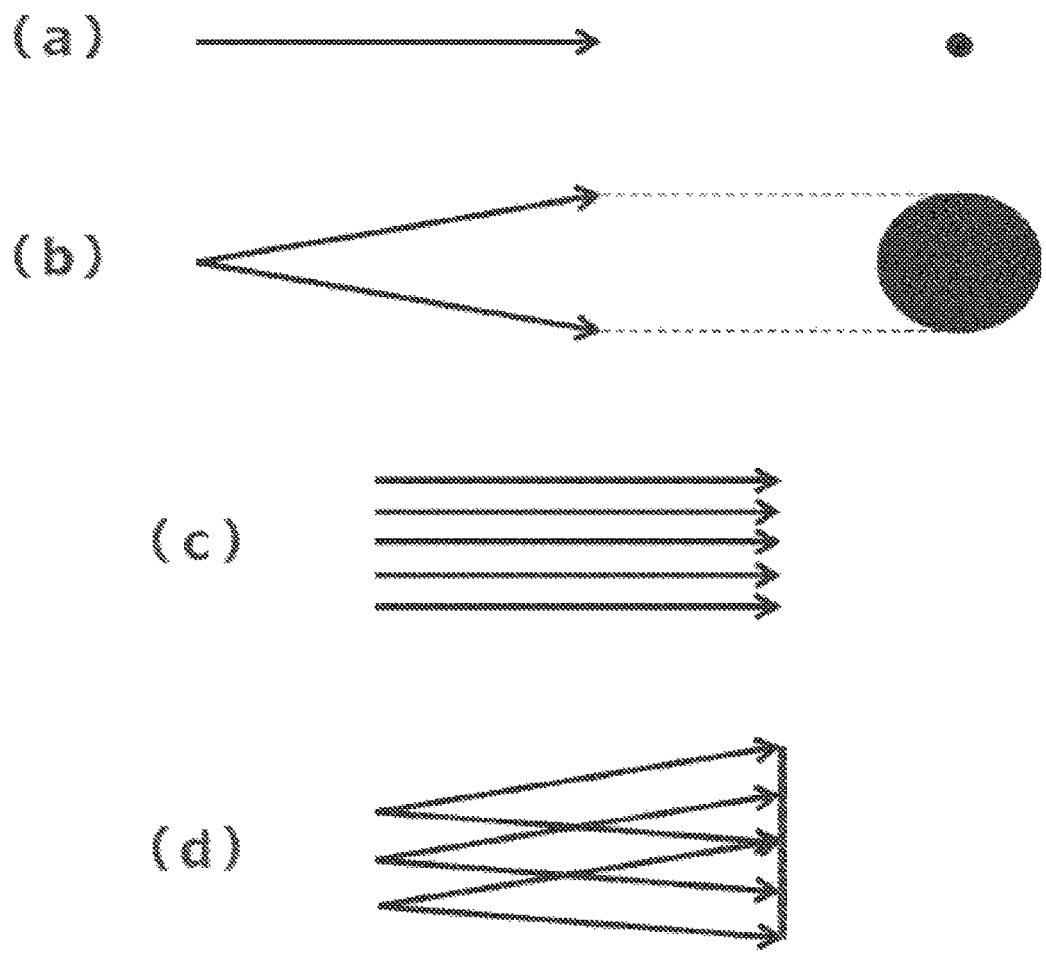
FIG. 10 is a diagram illustrating other examples of light projection patterns according to a first embodiment.

FIG. 10 is a diagram illustrating examples of the modes of the light projected by the light projection units in the sensor. Each of the light projection units can project a straight light beam, as shown in FIG. 10(*a*). Also, each of the light projection units can project a conic light beam, as shown in FIG. 10(*b*). When FIG. 10(*a*) is compared with 10(*b*), it can be understood that, even if the same light projection unit projects light, the reaching area of the light changes, and the detection area changes accordingly. The light projection units may also project parallel light beams, as shown in FIG. 10(*c*). Furthermore, each of the light projection unit may also project a radial beam, as shown in FIG. 10(*d*). In a first embodiment, light beams from a plurality of light projection units may be combined to detect measurement information. For example, measurement information can be detected in a given area by combining radial beams, as shown in FIG. 10(*d*).

The sensor may also temporally change the mode of the light from the light projection units. For example, a straight beam and a conic beam may be alternately projected every 0.1 second. Note that the mode of the light projected by the light projection units is not limited to these examples, and may be any mode.

The detection area of the sensor also changes depending on the area in which the light receiving units are provided. Thus, variation of the detection area of the sensor can be changed by combining the mode of the beams from the light projection units and the area in which the light receiving units are arranged.

Figure 11:
FIG. 11 is a diagram illustrating examples of light reception patterns according to a first embodiment.
Figure 11:
Figure 11:
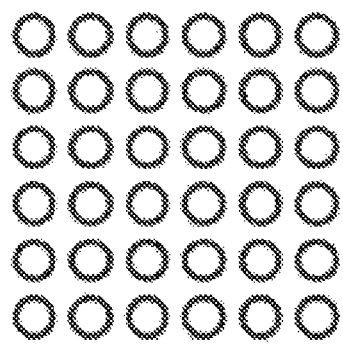
Figure 11:
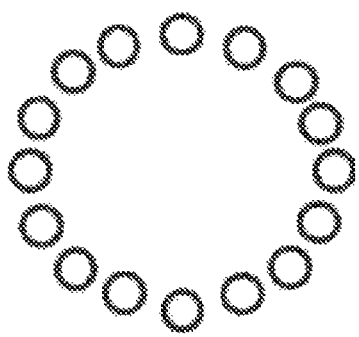

FIG. 11 is a diagram illustrating arrangement examples of the light receiving units. As shown in FIGS. 11(a) and 11(b), the plurality of light receiving units may be arranged in a vertical line or a horizontal line. The plurality of light receiving units may alternatively be arranged to form a square shape as shown in FIG. 11(c), or may be arranged to form a circular shape, as shown in FIG. 11(d).

The sensor may also temporally change the arrangement of the light receiving units. For example, the arrangement of the light receiving units may be repeatedly changed to the arrangement in a vertical line, the arrangement in a horizontal line, and then to the square arrangement, every 0.2 seconds. Note that a state similar to that in the case of changing the arrangement of the light receiving units may be achieved by changing those light receiving units, of the plurality of light receiving units, that receive light, rather than actually changing the arrangement of the light receiving units. For example, if light is to be received in a square shape, all of the light receiving units receive light, but if light is to be received in a vertical line, some of the plurality of light receiving units receive light. Note that the arrangement of the light receiving units is not limited to these examples, and may be any arrangement.

In the case of temporally changing the mode of the light projected by the light projection units and/or the arrangement of the light receiving units in the sensor, target determination is performed through matching with a learning model, and therefore, temporal patterns of the mode of the light and/or the arrangement of the light receiving units need to be input to a determination unit.

The sensor can detect measurement information indicating the position at which a target is present, the mode (orientation) in which the target is present, movement of the target, the shape of the target, the complexity of the target, and the like, by temporally changing the mode of the light projected by the light projection units and/or the arrangement of the light receiving units.

Detection of Reflected Light, Direct Light, and Transmitted Light

Note that any of reflected light, direct light, and transmitted light of the light radiated by the light projection units can be detected by adjusting the arrangement of the light projection units and the light receiving units. An object can be more readily identified by combining reflected light, direct light, and transmitted light.

In contrast, only reflected light of illumination or ambient light can be detected with a method using a camera.

For example, in the interior of a vehicle, each portion of a human body is in a state of being surrounded by parts of the vehicle, and a more complicated state can be identified by combining reflected light, direct light, and transmitted light. Also, by providing the light projection units and the light receiving units to a hand and/or a foot of a robot or to the body thereof, the detection pattern can be changed in accordance with a change in the orientation caused by movement of the hand and/or the foot.

For example, to learn or detect the state of grabbing an object using a hand, it is conceivable to detect direct light and reflected light from the light projection units that are provided in a finger of a robot that corresponds to a thumb, using the light receiving units that are provided in a finger located at a position opposing the light projection units in the thumb. Creation of such learning data makes it possible to learn or detect a state where the hand has reached a position at which the hand can hold a target. Also, when learning data is created, in the case of providing the light receiving units in a hand of a robot, reflected light, transmitted light, or direct light from a detection target can be detected even at a very close distance from this detection target. Accordingly, in the case of using the light projection units and the light receiving units, there are only a few cases where there is a dead angle as in the case of using a camera. Furthermore, since transmitted light can be detected, a feature of an object through which light passes, such as a glass cup or a paper cup, can also be learned. Thus, the ability to distinguish between an object through which light passes and an object through which light does not pass can be enhanced. Also, the ability to distinguish between objects with the same shape and different materials can be enhanced by learning differences in light transmission characteristics.

Color Detection

An object that is visible to a person can be detected using, as each of the light projection units, a light-emitting device that radiates white light, such as a white LED. An object that reflects light of a specific color can also be detected using, as each of the light projection units, a light-emitting device capable of radiating light with a wavelength in a specific band. An ability to identify a color pattern, such as a pattern with a target color or design, or a printed diagram, can also be acquired by learning differences in reflection between colors.

An object that reflects light of a specific color can also be detected using, as each of the light receiving units, a light-receiving device capable of detecting light with a wavelength in a specific band.

The light projection units or the light receiving units may also employ a filter through which only light in a predetermined band passes. For example, if a large number of light projection units and light receiving units are provided in a hand of a robot, it is then possible to detect not only the shape of a target that has approached the robot, but also differences in the color pattern, such as design, diagrams, and characters. Thus, for example, the orientation of a canned drink or the like can be detected. Also, for example, a hand approaching from a specific direction can also be detected. For example, in the case of applying this detection method to a care robot, a portion, such as a hand, a foot, or the face, of a cared-for person where the skin is exposed, and a portion of clothes can be distinguished, and the care robot can appropriately care the cared-for person.

Identification of Object Based on Color

A color difference in a target can be detected by enabling the light projection units or the light receiving units to detect light with wavelengths in different bands, and detecting a target using the different bands. Thus, for example, a color difference between portions of the target can be detected. For example, a difference in the pattern of a target object, a target animal, and a target plant can be distinguished. For example, vertical stripes of red and blue can be detected by arranging, in parallel, light projection units and light receiving units that are configured to detect blue and red. Vertical stripes with a predetermined width can also be detected by adjusting the gap between the light projection units and the light receiving units.

A difference in reflected color between target portions or directions can be detected by detecting light with wavelengths in different bands at respective positions of the light projection units or respective positions of the light receiving units. For example, it is possible to detect an object that shows different colors depending on the incident direction and the reflection direction of light, such as the surface of metal that has been processed through anodic oxidation, an iridescent insect, or a compact disk. By combining motion of a target and a change in the arrangement of the light projection units and the light receiving units, it is possible to detect a feature that can only be detected by visually checking a target from different directions.

This detection cannot be performed with a monocular camera. If detection is performed simultaneously in multiple directions using a camera, a plurality of cameras are required, resulting in a significant increase in costs.

Location to Install Sensor

The sensor is installed in an area where the state of a predetermined space is to be detected. For example, in the case of detecting the state inside the automobile, the sensor is installed inside the automobile. In the case of detecting the state outside the automobile, the sensor is installed outside the automobile.

The sensor is installed on projections or in recessed portions of a non-flat surface within a predetermined space whose state is to be detected, for example. The sensor may alternatively be integrated with an existing device, an existing component, or the like that is present in the predetermined space whose state is to be detected, for example. Note that the location to install the sensor is not limited to these examples, and may be any location within a predetermined space whose state is to be detected.

The sensor for monitoring the surroundings of the automobile is arranged outside the automobile, and is, for example, installed in or integrated with a headlight, a turn signal, an emblem, a wiper, a front grill, a door mirror, a front face of a room mirror, or the like.

The sensor for detecting a target inside the automobile is arranged inside the automobile, and is, for example, installed in or integrated with a dashboard, a pillar sensor, a console, a seat, an audio/car navigation system, a push start switch, a power window switch, or the like.

For example, a target that is present in a front seat inside the automobile can be detected by arranging the light projection units and the light receiving units in the sensor, in a dashboard. There are a plurality of projections or recessed portions of a non-flat surface of a dashboard, and the direction of the light radiated from the sensor and the area in which the sensor can detect a target change in accordance with the position at which the sensor is arranged. For this reason, the sensor is installed while giving consideration to a target to be detected and the area to be detected.

The sensor for detecting a target inside the automobile may also be integrated with a lighting device, for example, and may also be integrated with a room light above a front seat, a center room light, a spotlight for a driver seat, a footlight below the driver seat, a spotlight for a passenger seat, a rear right spotlight, a rear center spotlight, a rear left spotlight, a door light for the driver seat, a door light for a passenger seat, a rear right door light, a rear left door light, or the like.

Detection by Sensor

The sensor installed inside or outside the automobile can collect measurement information for detecting whether or not a target is present, by projecting and receiving infrared light, for example. The sensor can also collect measurement information for detecting the shape of a target. The shape of a target means, for example, the size of the body of a person or a robot, the length of a hand and/or a foot, the shape and/or the size of the head, the position and/or shape of a specific organ, and the like. A specific organ is, for example, the eyes, the nose, the mouth, or the like.

The sensor can also collect measurement information for detecting the shape of a target. For example, the sensor can collect measurement information for detecting the direction and/or the expression (smiling, crying etc.) of the face, blinking, or the like. The sensor can also collect measurement information for detecting the state the of left and/or right arm, the state (direction, position, bending etc.) of an upper arm, the state of a hand, or the like. The sensor can also collect measurement information for detecting the state of the left and/right foot, the state (direction, curving etc.) of the trunk, or the like.

The sensor can also collect measurement information for detecting movement of a person or a robot, and can collect, for example, measurements for detecting whether or not a specific portion of a body is present close to a predetermined position, or for detecting movement the body at a predetermined position.

Detection Target of Sensor

The target (detection target) for which the sensor collects measurement information is the state of a predetermined space, and examples thereof are as follows.

First, whether or not a target is present, the mode of the presence thereof, and the like, may be detection targets of the sensor. For example, the presence of a person is a detection target, and specifically, whether or not any occupant is present inside the automobile, and whether or not an occupant is present at each of the seats are detection targets of the sensor. The mode in which a person is present is also a detection target. For example, whether or not an occupant has assumed a seated orientation, or the shape of the body, the position of a hand and/or a foot, and the like, are also detection targets.

The presence of an object is also a detection target. For example, whether or not an object is present, the type of an object that is present, and the like, are detection targets. For example, the presence of luggage, the size of the luggage, the shape (e.g. rectangular-parallelepiped etc.) of the luggage are detection targets.

Operations are also detection targets. For example, operations associated with driving are detection targets. An operation of a pedal, an operation of a steering wheel, a shifting operation and an operation of any of various switches are detection targets. Operations other than the operations associated with driving are also detection targets. For example, getting into/out of the automobile is also a detection target. When a person gets into the automobile, unlocking of a door is a detection target, and a person approaching the automobile, an operation of a door handle, unlocking of the door, and so on, are detection targets. Furthermore, when a person gets off the automobile, unfastening of a seat belt is a detection target, for example.

Furthermore, gestures of an occupant inside the vehicle and motion of a hand to operate a switch may be detection targets. For example, an operation of a car navigation device and an operation of an audio device are detection targets.

An operation of a mobile terminal (a mobile phone, a smartphone etc.) may also be a detection target. For example, an object on a smartphone that is present near the front side of the head in a driving seat may be a detection target. Depending on the position of the smartphone, there is a possibility that a driver is operating the smartphone while driving the vehicle, and a warning can be given to the driver. If the smartphone is being operated while the vehicle is stopped, for example, it can be predicted that the car navigation system should be linked with the smartphone.

Actions can also be classified by setting environments inside and outside the automobile and actions of a person in these environments as detection targets. For example, if actions of a person, such as a steering operation, a braking operation, and a switch operation, are detected in various environments such as a hot environment, a bright environment, and a cold environment, an action according to an environment and actions to address a situation can be analyzed and classified.

Movement of other automobiles is also a detection target. For example, movement of a nearby vehicle, or more specifically, movement of a leading vehicle, movement of a following vehicle, movement of an oncoming vehicle, and the like, may also be detection targets. The distance to a leading vehicle, the approach speed, the timing of interruption, and the like, can also be detection targets. As for people, occupants such as a driver and a passenger, a person who is present around the automobile, and the like, may also be detection targets of the sensor. By setting these people to detection targets, the classification apparatus can specify a suspicious action of a person, for example.

Detection targets around the automobile include, for example, the presence of a leading vehicle, a pedestrian, a building, and the like. For example, by setting an obstacle that is present in front of the automobile as a detection target of the sensor, the classification apparatus can estimate, for example, the risk that the obstacle affects the automobile.

A target that is to be detected under a predetermined situation can also be set as a detection target of the sensor. For example, in the case where another automobile is present in front of the automobile, a person rushing out, interruption by a third automobile, a falling object, and the like, may be detection targets of the sensor. In the case where a bicycle is detected in front of the automobile, whether or not the bicycle is opposing the automobile in the proceeding direction of the automobile or in the same traffic lane, for example, is a detection target of the sensor. In the case where a guardrail that is present around the automobile is detected by the sensor, a pedestrian outside the guardrail and a pedestrian inside the guardrail are detection targets of the sensor, and the sensor can distinguish these detection targets. If sunlight is detected, the state where a person is present is a detection target of the sensor. For example, a portion of the body that is present in a location where the sunlight strikes may be a detection target of the sensor.

Level of Detection by Sensor

Levels may be set for the detection by the sensor. For example, the sensor may be set to a level at which whether or not a person is present is a detection target, or may also be set to a level at which the orientation of a person is a detection target. The position of a specific portion of a person may also be a detection target. Motion of this specific portion may also be a detection target. Furthermore, the meaning of a gesture may also be a detection target. The level of the detection by the sensors can be changed by adjusting the shape of the light projected by the light projection units in the sensor, the arrangement of the light receiving units, or the like.

Learning Data

Variations of learning data other than movement learning data in a first embodiment will be described below. Learning data is data that is created by the learning environment preparation apparatus 11 and is used in learning with the neural network 222, as mentioned above.

Learning data may also be driving operation learning data, for example. Driving operation learning data is learning data associated with the state of a driver, and is learning data for performing learning to predict an action of the driver such as a pedal operation. Sensors are attached to the driver who is driving, and learning data is acquired.

For example, the light projection units 111 and the light receiving units 113 in the learning environment preparation apparatus 11 may be installed around a foot of the driver, and the learning environment preparation apparatus 11 creates pedal operation learning data. Alternatively, the light projection units 111 and the light receiving units 113 in the learning environment preparation apparatus 11 are embedded in a steering wheel, or a predetermined number of light projection units 111 and light receiving units 113 are arranged around the steering wheel, and the learning environment preparation apparatus 11 creates steering operation learning data.

The learning data may also be switch operation learning data, for example. The switch operation learning data is learning data associated with a switch operation. The learning environment preparation apparatus 11 creates the switch operation learning data using the light projection units 111 and the light receiving units 113 that are embedded in a push start switch.

T learning data may also be front object detection learning data, for example. Front object detection learning data is learning data associated with whether or not an object is present in front of the vehicle. The learning environment preparation apparatus 11 creates the front object detection learning data for the case where an object is arranged in front of the vehicle and the case where an object is not arranged in front of the vehicle. For example, the learning environment preparation apparatus 11 stores the light projection patterns of the light projection units 111 and the light reception patterns of the light receiving units 113 in the case where an actual object or an object model is actually placed in front of the automobile, in association with each other. An object to be arranged in front of the vehicle is, for example, a road surface, a display on the road surface, a guardrail, a footbridge, a sign, or the like. The object may also be any of various kinds of vehicles, such as a truck and a private vehicle. The object may also be an object that is moving around a road, such as a pedestrian, an animal, or a bicycle.

Learning data may also be, for example, sunlight pattern detection data. Sunlight pattern detection data is learning data associated with the presence and/or the state of an object with respect to a plurality of types of sunlight. The learning environment preparation apparatus 11 creates learning data for training regarding the sunlight pattern detection data, based on patterns of the sunlight and/or light from the sky. In this case, the light projection units 111 are not necessarily needed, and learning data may also be created based on light reception patterns of ambient light, such as the sunlight. The classification apparatus can increase the accuracy of identification of the presence and/or the state of an object by learning sunlight patterns.

Learning data may also be, for example, tunnel detection data. Tunnel detection data is learning data associated with the presence and/or the state of an object at an entrance of a tunnel or inside the tunnel. The learning environment preparation apparatus 11 learns, for example, learning data created regarding an area near the entrance of the tunnel and learning data created regarding the inside of the tunnel.

Learning data may also be, for example, rain drop detection data. Rain drop detection data is learning data associated with the presence and/or the state of rain drops. The learning environment preparation apparatus 11 creates learning data in accordance with rainfall-amount data. Note that data may be collected by scattering water. The speed of rainfall can also be set by using a wind tunnel. Data in a state where there are no raindrops is also collected.

Learning data may also be, for example, data that is detected by an sunlight sensor/automatic light sensor. The sunlight sensor/automatic light sensor is learning data associated with sunlight and/or weather outside the automobile. A plurality of light projection units 111 and light receiving units 113, which serve as the sensor, are installed in the vehicle, and the learning environment preparation apparatus 11 acquires learning data while the vehicle is traveling and while the vehicle is parking. In this case, the spatial state information input unit 114 receives, as learning data, whether or not the sun is shining, the weather, position identification information, and the like, for example.

Note that learning data is not limited to the above examples, and may be any kind of learning data.

Learning with Neural Network 222

Learning with the neural network 222 according to a first embodiment will be described below. The learning apparatus 22 performs learning with the neural network 222 to create a classifier for appropriately classifying the state of a predetermined space through the learning.

Purpose of Learning with the Neural Network 222

The purpose of the learning with the neural network 222 is, for example, to detect a target (i.e. to create a classifier (classification device) capable of classifying the presence of a target), or to detect a specific state (i.e. to create a classifier (classification device) capable of classifying the state of a target). "Specific state" refers to, for example, a hand being present in a gesture area, or a tip portion of a foot being present on an acceleration pedal or a brake pedal, and is further aimed to detect that an acceleration pedal is about to be stepped on, or a brake pedal is about to be stepped on, for example.

The purpose of the learning with the neural network 222 may also be, for example, to detect that a hand is present near a door handle, that a hand is present near a selector lever, that a hand is present near a steering wheel, or a hand is approaching a car navigation device or an audio device. The purpose of the learning with the neural network 222 may also be, for example, to detect that an object other than a hand is present, or an occupant being leaning on his back side. The learning with the neural network 222 may also be to determine whether or not the selector lever is likely to be operated, whether or not the current state is a state where a steering operation can be performed, or whether or not voice command reception needs to be started, for example.

The purpose of the learning with the neural network 222 may also be to detect a state 3 when it is detected that a state 2 has been entered after a state 1 had been entered, i.e. to detect a change in the state.

Content of Learning with the Neural Network 222

A combination of sensors that highly contribute to state determination in each detection area may be learned with the neutral network 222 to learn to switch the detection area.

A classifier capable of classifying a movement pattern may also be created by learning, with the neural network 222, light projection patterns suitable for detection of specific states. For example, a light projection pattern suitable for detection of a specific state may also be learned with the neural network 222. Also, for example, a gesture of hand motion near a center console, foot motion for a pedal operation, an operation of a specific switch, or the like may also be learned with the neural network 222. An operation of a specific switch is, for example, an operation of a handle to open an inside door of the vehicle.

The above-described learning with the neural network 222 makes it possible to create a classifier capable of detecting a vehicle that is approaching from the back side and an operation of a handle to open an inside door, from a starting point that is a stoppage of an engine. As a result, a warning can be output if a predetermined operation, the presence of a vehicle, or the like is detected using the created classifier. Also, a classifier capable of classifying an operation to open an outside door may be created by learning, the neural network 222, the operation to open the outside door. Then, if a predetermined operation is detected using the created classifier, light can be projected into an area near an outside door handle.

Furthermore, switching of the light projection pattern, switching of the light reception pattern, and combinations of the light reception pattern and the light projection pattern can also be learned with the neural network 222.

Note that the learning with the neural network 222 is not limited to these examples, and may be any kind of learning.

Application

The classification system according to a first embodiment, in the case of being used to detect a target in an automobile, is applicable to the following applications. Note that the classification system according to a first embodiment can not only detect a target in an automobile, but can also detect the state of a predetermined space, and is applicable to various applications.

1) Seatbelt warning: The classification system according to a first embodiment can be used in an application for detecting occupants in an automobile. For example, whether or not any occupant is present in the automobile can be detected. Thus, whether or not each occupant in the automobile has fastened a seatbelt can be detected. If it is detected that an occupant is present in a seat and this occupant has not fastened the seatbelt, a warning sound can be issued. On the other hand, if no occupant is in a seat, it is possible to not issue a warning sound even if there is luggage, a pet, or the like in the seat. Conventionally, for example, whether or not any occupant is present is determined based on the weight applied to a seat, but there is a possibility that a warning sound is incorrectly issued if heavy luggage or a large pet is in the seat. However, whether or not any occupant is present can be correctly detected using the classification system according to a first embodiment, and incorrect warnings can be reduced.

2) Prevention of incorrect movement caused by incorrect operation: The classification system according to a first embodiment can not only issue a seatbelt warning as mentioned above, but is also applicable to an application for reducing various incorrect operations by detecting a gesture of an occupant. For example, the classification system can be used in an application capable of detecting a brake pedal and an acceleration pedal having been stepped on incorrectly, and thus reducing incorrect operations. For example, this application determines based on the detected motion that an incorrect operation has been made if motion to step on the acceleration pedal is detected even though the motion of an occupant differs from the normal motion, e.g. the eyes of the occupant are not looking forward (e.g. are looking downward), and mitigates the degree to which the acceleration pedal is stepped on. This application can thus prevent an incorrect operation from being made, e.g. can suppress the acceleration of the automobile in the case where, for example, an occupant is dozing off or has lost his consciousness.

3) Monitoring of the surroundings of an automobile: The classification system according to a first embodiment can be used in an application for monitoring the surroundings of an automobile. For example, the front side of the automobile can be monitored using a sensor that is installed on the front side of the automobile, and the state of a space in front of the automobile can be detected. Also, for example, both sides of the automobile can be monitored using sensors that are installed on both sides (left and right) of the automobile, and the state of spaces on both sides of the automobile can be detected. Furthermore, the state of a space behind the automobile can also be detected using the sensor that is installed on the rear side of the automobile.

The application that provides the above service can use, for example, a monitoring method using a camera, but there may be a dead angle depending on the direction of the camera lens, and the spatial state cannot be correctly detected in some cases. Moreover, cameras are expensive, and it is difficult to install a large number of cameras. The classification system according to a first embodiment can more correctly detect the spatial state by installing a plurality of light projection units and light receiving units, which are more inexpensive than cameras and can detect a target by means of light beams, and detect an object. For example, the classification system can detect whether or not an object is present, even in a space that is at a dead angle in the case of using a camera or the like, by installing the light projection units and the light receiving units at an outermost portion of an outer part of the automobile that may possibly collide with (i.e. come into contact with) other objects, and thus can correctly monitor the surroundings of the automobile.

In the case of adjusting the output of the sensor and measuring a position that is distant from an automobile, the classification system according to a first embodiment can detect the presence of a suspicious person around the automobile by performing sensing while the automobile is parking, and thus can be used in an application for detecting a preliminary theft operation.

4) Prevention of contact with robot: Similarly, the classification system according to a first embodiment is also applicable to, for example, an application for preventing a robot from coming into contact with other objects, by setting the light projection units and the light receiving units in a portion of the robot that may possibly come into contact with other objects.

5) Detection of sunlight pattern: The classification system according to a first embodiment can also be used in an application for identifying an sunlight pattern. For example, the classification system can comprehend the sunlight state inside the automobile by learning, in advance a situation inside the automobile in the case where the sun is shining and a situation inside the automobile in the case where the sun is not shining, and comparing the currently observed state with the situations that have been learned in advance. The classification system can thus comprehend that the temperature inside the automobile is high, for example, and is therefore applicable to an application for preventing an accident due to a child being left in the automobile, in addition to detecting the presence of people inside the automobile, for example.

6) Others: The classification system according to a first embodiment is also applicable to, for example, an application that detects raindrops and gives a notification that it is raining, by detecting whether or not a car has entered a tunnel, or detecting an object with a specific shape at a specific position outside the automobile, using the sensor that is installed outside the automobile.

A learning method using supervised training data has been described above. Note that, in a first embodiment, learning can also be performed using unsupervised learning data, depending on the content of the ability that is expected as a result of the learning. For example, the following learning, which is described as examples, can be performed using unsupervised learning data. Note that, needless to say, learning using unsupervised learning data is not limited to the following example.

For example, learning to classify the state where an object is present within a space into a predetermined number of groups so as to classify similar states into the same group can also be performed with unsupervised learning data. For example, unsupervised learning can be performed as learning that enables shapes of human bodies, shapes of legs, or the like to be classified into 10 groups.

Also, for example, learning to classify motions of an object within a space into a predetermined number of groups so as to classify similar motions into the same group can be performed using unsupervised data. For example, learning to classify driving operations performed by many people into 20 groups can be performed using unsupervised data.

As described above, learning can be performed in accordance with predetermined expected content by creating a function for evaluating classification results to perform learning. Note that the classification apparatus according to a first embodiment is applicable not only to the above examples but also to applications that can be acquired through unsupervised learning utilizing deep learning.

Second Embodiment

A second embodiment will be described with reference to the drawings.

A second embodiment is one or more embodiments in the case of using an auxiliary sensor, in addition to the above-described sensor, to create learning data and detect the state where a target is present. The ability to detect the state of a predetermined space can be further enhanced by using various auxiliary sensors in addition to the sensor for projecting and receiving light such as infrared light.

Figure 12:
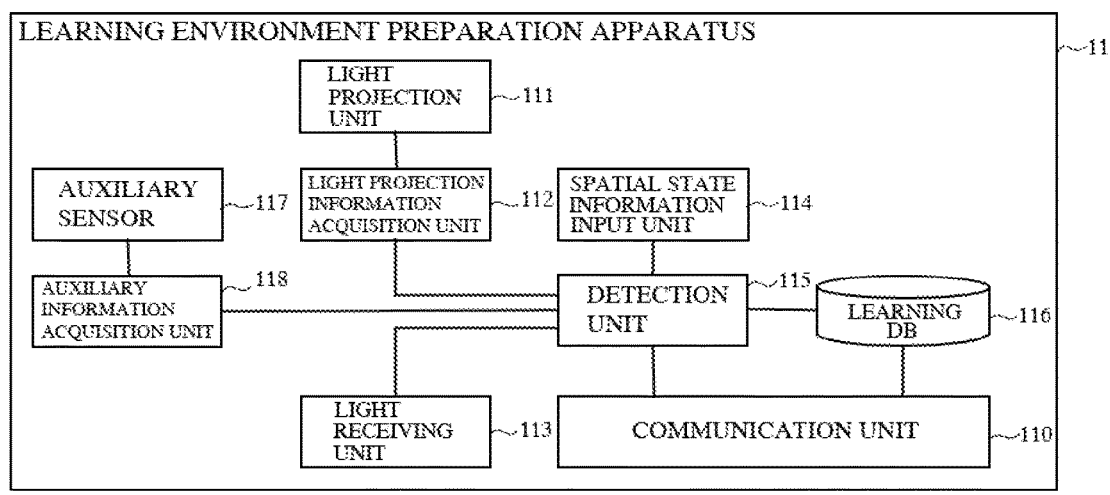
FIG. 12 is a diagram illustrating a configuration example of a learning environment preparation apparatus according to a second embodiment.

FIG. 12 is a diagram illustrating a configuration example of the learning environment preparation apparatus 11 according to a second embodiment. As shown in FIG. 12, the learning environment preparation apparatus 11 includes an auxiliary sensor 117.

Figure 13:
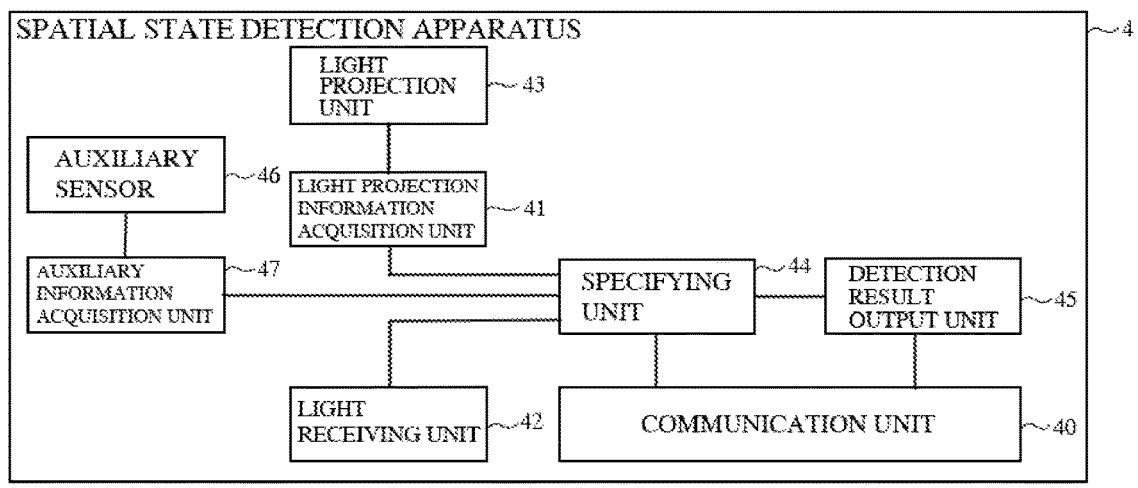
FIG. 13 is a diagram illustrating a configuration example of a spatial state detection apparatus according to a second embodiment.

FIG. 13 is a diagram illustrating a configuration example of the spatial state detection apparatus 4 according to a second embodiment. As shown in FIG. 13, the spatial state detection apparatus 4 includes an auxiliary sensor 46.

Auxiliary Sensor

The learning system according to one or more embodiments can use auxiliary sensors to enhance the detection ability. The auxiliary sensors are not limited to sensors using light beams, such as infrared beams, but may be any kind of sensors. As a result of using data detected by the auxiliary sensors in learning, the state of a predetermined space can be detected using information from the auxiliary sensors.

1) Capacitance sensor: For example, a capacitance sensor can be used as an auxiliary sensor. A capacitance sensor is a sensor that is similar to an infrared sensor described in a first embodiment, and such a capacitance sensor may be used as an auxiliary sensor, or may be used in place of the infrared sensor.

2) Signal in in-vehicle LAN: A sensor that acquires information from an external device may also be an auxiliary sensor. For example, the auxiliary sensor can acquire information indicating an operation of a driving operation unit, from a signal coming through an in-vehicle LAN. As the information indicating operations of the driving operation unit, a steering operation, an operation of an acceleration pedal, an operation of a brake pedal, an operation of a wiper, and the like can be comprehended. Since there may be cases where such information is private information indicating the driver of the automobile, for example, the information may also be collected only if the driver of the automobile agrees with the collection of the information.

3) Information indicating operations of equipment in the interior of the vehicle: A sensor that acquires information indicating operations other than driving operations may also be used as an auxiliary sensor. For example, the auxiliary sensor can acquire information indicating an operation of equipment in the interior of the vehicle, such as an operation of a power-window and an operation to lock a door. The auxiliary sensor can also acquire information indicating an operation of an air-conditioner, an operation of an audio device, and an operation of a navigation device. The auxiliary sensor can also acquire information indicating operations of a remote controller. The operations of the remote controller include, for example, unlocking of a door, unlocking of a trunk, and starting of an engine.

4) Monitoring device: A sensor that acquires information from a monitoring device may also be used as an auxiliary sensor. The monitoring device is information such as a drive recorder, for example. Furthermore, the auxiliary sensor may also acquire information from information indicating an operation of a wireless communication terminal (e.g. a mobile phone, a smartphone etc.) or a portable device such as a smart watch, inside an automobile. An IoT (Internet of things) sensor can also be used as an auxiliary sensor. Information from the IoT sensor can be acquired via an in-vehicle gateway device, for example. Note that the IoT sensor is not limited to a sensor installed inside the automobile but may be installed at any position, such as a position along a road, and can use, in detection, information collected from this sensor via a network.

5) Wearable sensor: a sensor that a movement detection target is wearing can also be used as an auxiliary sensor. For example, the auxiliary sensor can collect the state of movement of an arm, the body temperature, the heart rate, and so on that can be acquired from a smart watch, which serves as a wearable device. Also, a medical device, such as a sphygmomanometer or a clinical thermometer, can also be used as an auxiliary sensor. Furthermore, a sensor that is attached to a robot or a machine can also be used as an auxiliary sensor.

6) Sensor installed on a device within a space: A sensor included in a device within a detection target space can also be used as an auxiliary sensor. For example, a sensor such as a speed meter, a thermometer, or a camera that is installed along a road, or a sensor such as a security camera installed in a vehicle or a building around a detection target can be used as an auxiliary sensor.

7) Monitoring sensor: A sensor for monitoring a movement detection target can also be an auxiliary sensor. For example, there is a sensor capable of monitoring a detection target while identifying and tracking the detection target. For example, a sensor capable of specifying an individual person or object and tracking the position at which it is present using the face or an ID (identifier) thereof can be used as an auxiliary sensor.

8) Camera, pressure sensor etc.: A sensor capable of detecting the position of a face, a line of sight, a facial expression, or the like, such as a camera, and a sensor capable of detecting attributes (gender, age), expressions, or the like of a person can also be used as auxiliary sensors. There is also a pressure sensor that is installed in a seat of an automobile and can detect an occupant having seated or luggage being placed, based on the pressure.

9) Sound collection sensor: an auxiliary sensor may also be a sensor capable of collecting sound, and determination can be performed in accordance with a surrounding situation by detecting the surrounding situation using this auxiliary sensor. For example, by using a sound collection sensor, such as a microphone, that is installed inside an automobile as an auxiliary sensor, it can be understood that the automobile has stopped or entered a parking state if it is detected that it is silent around the automobile.

10) Distance measurement sensor: a sensor for measuring the distance can also be used as an auxiliary sensor. The distance measurement sensor makes it possible to comprehend a situation of a location distant from an automobile. A target can be detected by changing the direction of the distance measurement sensor and/or the distance measurement pattern.

11) Wiper control sensor: An auxiliary sensor may also be a combination of a water detection sensor, a camera image, and a raindrop sensor, and raindrops and a rain-fall situation can be detected by this auxiliary sensor.

The learning environment preparation apparatus 11 according to a second embodiment includes an auxiliary information acquisition unit 118. The auxiliary information acquisition unit 118 detects auxiliary information based on measurement information from the auxiliary sensor 117. The auxiliary information acquisition unit 118 notifies the detection unit 115 of the detected auxiliary information.

The detection unit 115 associates (or links) (1) information indicating the state of a detection target of which the detection unit 115 has been notified by the spatial state information input unit 114, (2) the light projection pattern of which the detection unit 115 has been notified by the light projection information acquisition unit 112, (3) the light reception pattern of which the detection unit 115 has been notified by the light receiving unit 113, and (4) the auxiliary information of which the detection unit 115 has been notified by the auxiliary information acquisition unit 118, with each other. The detection unit 115 thereafter notifies the learning DB 116 of this association (link).

Note that, every time the learning DB 116 is notified by the detection unit 115, the learning DB 116 stores (1) the information indicating the state of the detection target, (2) the light projection pattern of which the detection unit 115 has been notified by the light projection information acquisition unit 112, (3) the light reception pattern of which the detection unit 115 has been notified by the light receiving unit 113, and (4) the auxiliary information of which the detection unit 115 has been notified by the auxiliary information acquisition unit 118, in association with each other.

As a result, the learning environment preparation apparatus 11 can create learning environment preparation device, which is training data, while also giving consideration to the auxiliary sensor.

Also, the specifying unit 44 in the spatial state detection apparatus 4 detects the state of a predetermined space using a classifier created through learning with the neural network, based on the light projection pattern of the light projection unit 41, the light reception pattern of the light receiving unit 43, and the auxiliary information from the auxiliary sensor 46.

As a result, the spatial state detection apparatus 4 can detect the state of a predetermined space while also giving consideration to the auxiliary sensor.

As described above, in a second embodiment, the state of an object is detected using the auxiliary sensor, in addition to the sensor such as an infrared sensor, and it is therefore possible to enhance the ability to detect the state of a predetermined space.

Note that the above-described auxiliary sensor is merely an example, and needless to say, any other auxiliary sensors can be used. Furthermore, in a second embodiment as well, learning using unsupervised learning data can also be performed depending on the content of the ability that is expected as a result of the learning, similarly to a first embodiment.

Although one or more embodiments have been described based on the drawings, it should be noted that a person skilled in the art could readily modify or correct one or more embodiments in various manners based on the present disclosure. Accordingly, it should be noted that such modification and correction are encompassed by the scope of the present invention. For example, means, functions included in steps, and so on, can be rearranged so that there is no logical inconsistency, and a plurality of means or steps can be combined into one element, or one means or step can be divided. Furthermore, the configurations described in the above embodiments can also be combined as appropriate.

One or more embodiments can also be described as follows.

Note 1: A classification apparatus including:
   a memory storing a specifying unit into which a neural network is integrated that has been trained to classify a state of a space using information indicating a light projection pattern and information indicating a light reception pattern; and
      a hardware processor connected to the memory,
      wherein the hardware processor is configured to
      acquire information indicating a light projection pattern of light projected into a predetermined space and output the acquired information to the specifying unit,
      acquire information indicating a light reception pattern of light received from the predetermined space and outputs the acquired information to the specifying unit, and
      output a classification result of the specifying unit classifying a state of the predetermined space, based on the information indicating the light projection pattern acquired by a light projection information acquisition unit, and on the information indicating the light reception pattern of the light received by a light receiving unit.

Note 2: A classification method including:
   an integration step of integrating a neural network that has been trained to classify a state of a space using information indicating a light projection pattern and information indicating a light reception pattern;
   a light projection information acquisition step of acquiring information indicating a light projection pattern of light projected into a predetermined space and outputting the acquired information to a specifying unit, by at least one hardware processor;
   a light receiving step of acquiring information indicating a light reception pattern of light received from the predetermined space and outputting the acquired information to the specifying unit, by at least one hardware processor; and a step of outputting a classification result of classifying, during a specifying step, a state of the predetermined space, based on the acquired information indicating the light projection pattern, and on the information indicating the light reception pattern regarding received light, by at least one hardware processor.

The invention claimed is:

1. A classification apparatus comprising a communication interface, a sensor and a processor coupled to the communication interface and the sensor, the processor configured with a program to perform operations comprising:
   detecting a state of a space indicating information about a detection target, with an integrated neural network trained to classify the state of the space using information received from the communication interface indicating a light projection pattern and information indicating a light reception pattern;
   acquiring, from the sensor, the information indicating the light projection pattern of light projected into a predetermined space, and outputting the acquired information to the integrated neural network through the communication interface; and
   acquiring, from the sensor through the communication interface, the information indicating the light reception pattern of light received from the predetermined space, and outputting the acquired information to the integrated neural network through the communication interface, wherein
   the processor is configured with the program to perform operations such that detecting the state of the space comprises outputting, to the communication interface, a classification result of the classifying the state of the predetermined space, based on the acquired information indicating the light projection pattern and based on the acquired information indicating the light reception pattern of the light.

2. The classification apparatus according to claim 1, wherein the processor is configured with the program to perform operations comprising operations such that:
   acquiring the information indicating the light projection pattern comprises acquiring information indicating the light projection pattern of light projected onto the detection target within the predetermined space, and outputting the acquired information to the integrated neural network through the communication interface;
   acquiring the information indicating a light reception pattern comprises acquiring a light reception pattern of the light projected onto the detection target within the predetermined space, and outputting the acquired light reception pattern to the integrated neural network through the communication interface; and
   detecting of the space comprises outputting a classification result of classifying a presence or a state of the detection target within the predetermined space.

3. The classification apparatus according to claim 1, wherein
   the neural network is trained to classify the state of the space using information indicating the light projection pattern of light that is projected into the space that is given in advance, and information indicating the light reception pattern of light received from the space that is given in advance.

4. The classification apparatus according to claim 1, wherein
   the neural network is trained to classify the state of the space using information indicating a plurality of light projection patterns, and information indicating light reception patterns of the light that is received in response to projecting the plurality of light projection patterns.

5. The classification apparatus according to claim 1, wherein
the neural network is trained to classify the state of the space using learning data in which the information indicating the light projection pattern, the information indicating the light reception pattern, and information indicating the state of the space are associated with each other.

6. The classification apparatus according to claim 1, wherein
the neural network is trained to classify the state of the space using auxiliary information from an auxiliary sensor, in addition to the information indicating the light projection pattern and the information indicating the light reception pattern.

7. The classification apparatus according to claim 2, wherein
the neural network is trained to classify the state of the space using information indicating the light projection pattern of light that is projected into the space that is given in advance, and information indicating the light reception pattern of light received from the space that is given in advance.

8. The classification apparatus according to claim 2, wherein
the neural network is trained to classify the state of the space using information indicating a plurality of light projection patterns, and information indicating light reception patterns of light that is received in response to projecting the plurality of light projection patterns.

9. The classification apparatus according to claim 2, wherein
the neural network is trained to classify the state of the space using learning data in which the information indicating the light projection pattern, the information indicating the light reception pattern, and information indicating the state of the space are associated with each other.

10. The classification apparatus according to claim 2, wherein
the neural network is trained to classify the state of the space using auxiliary information from an auxiliary sensor, in addition to the information indicating the light projection pattern and the information indicating the light reception pattern.

11. The classification apparatus according to claim 3, wherein
the neural network is trained to classify the state of the space using information indicating a plurality of light projection patterns, and information indicating light reception patterns of light that is received in response to projecting the plurality of light projection patterns.

12. The classification apparatus according to claim 3, wherein
the neural network is trained to classify the state of the space using learning data in which the information indicating the light projection pattern, the information indicating the light reception pattern, and information indicating the state of the space are associated with each other.

13. The classification apparatus according to claim 3, wherein
the neural network is trained to classify the state of the space using auxiliary information from an auxiliary sensor, in addition to the information indicating the light projection pattern and the information indicating the light reception pattern.

14. The classification apparatus according to claim 4, wherein
the neural network is trained to classify the state of the space using learning data in which the information indicating the light projection pattern, the information indicating the light reception pattern, and information indicating the state of the space are associated with each other.

15. The classification apparatus according to claim 4, wherein
the neural network is trained to classify the state of the space using auxiliary information from an auxiliary sensor, in addition to the information indicating the light projection pattern and the information indicating the light reception pattern.

16. The classification apparatus according to claim 5, wherein
the neural network is trained to classify the state of the space using auxiliary information from an auxiliary sensor, in addition to the information indicating the light projection pattern and the information indicating the light reception pattern.

17. A classification method comprising:
detecting a state of a space with an integrated neural network trained to classify the state of the space using information received from a communication interface indicating a light projection pattern and information indicating a light reception pattern;
acquiring, from a sensor over the communication interface, information indicating the light projection pattern of light projected into a predetermined space, and outputting the acquired information to the integrated neural network through the communication interface; and
acquiring, from the sensor over the communication interface, information indicating the light reception pattern of light received from the predetermined space, and outputting the acquired information to the integrated neural network through the communication interface, wherein
detecting the state of the space comprises outputting to the communication interface a classification result of classifying the state of the predetermined space based on the acquired information indicating the light projection pattern and the acquired information indicating the light reception pattern of the received light.

18. A non-transitory computer-readable storage medium storing a program, which when read and executed, causes a computer to perform operations comprising:
detecting a state of a space with an integrated neural network trained to classify the state of the space using information received from a communication interface indicating a light projection pattern and information indicating a light reception pattern;
acquiring, from a sensor over the communication interface, information indicating the light projection pattern of light projected into a predetermined space, and outputting the acquired information to the integrated neural network through the communication interface; and
acquiring, from the sensor over the communication interface, information indicating the light reception pattern of light received from the predetermined space, and outputting the acquired information to the integrated neural network through the communication interface, wherein detecting the state of the space comprises outputting to the communication interface a classification result of classifying the state of the predetermined space based on the acquired information indicating the light projection pattern and the acquired information indicating the light reception pattern of the received light.

* * * * *